US012432565B2

(12) United States Patent
Boucadair et al.

(10) Patent No.: US 12,432,565 B2
(45) Date of Patent: Sep. 30, 2025

(54) METHODS FOR CONFIGURING A USER APPARATUS, NEGOTIATING WITH A NETWORK ENTITY, AND MANAGING A CONNECTION, AND ASSOCIATED DEVICES

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 162 days.

(21) Appl. No.: 18/246,757

(22) PCT Filed: Sep. 27, 2021

(86) PCT No.: PCT/FR2021/051663
§ 371 (c)(1),
(2) Date: Mar. 27, 2023

(87) PCT Pub. No.: WO2022/069825
PCT Pub. Date: Apr. 7, 2022

(65) Prior Publication Data
US 2023/0370848 A1      Nov. 16, 2023

(30) Foreign Application Priority Data
Sep. 29, 2020    (FR) ..................... 2009920

(51) Int. Cl.
*H04L 29/06*    (2006.01)
*H04W 12/03*    (2021.01)
(Continued)

(52) U.S. Cl.
CPC ........... *H04W 12/37* (2021.01); *H04W 12/03* (2021.01); *H04W 12/08* (2013.01); *H04W 76/12* (2018.02)

(58) Field of Classification Search
CPC ..... H04W 12/37; H04W 12/03; H04W 12/08; H04W 76/12; H04W 12/033;
(Continued)

(56) References Cited

U.S. PATENT DOCUMENTS 8,144,678 B1 * 3/2012 Breau ................. H04W 12/033
455/448
9,306,913 B1 * 4/2016 Volkov ................. H04L 63/029
(Continued)

FOREIGN PATENT DOCUMENTS

WO    2009078103 A1    6/2009

OTHER PUBLICATIONS

"3rd Generation Partnership Project; Technical Specification Group Services and System Aspects; Study on Access Traffic Steering, Switch and Splitting support in the 5G system architecture Phase 2 (Release 17)", Sep. 9, 2020 (Sep. 9, 2020), XP051933330 (Year: 2020).*

(Continued)

*Primary Examiner* — Ka Shan Choy
(74) *Attorney, Agent, or Firm* — David D. Brush; Westman, Champlin & Koehler, P.A.

(57) ABSTRACT

A method for configuring a user apparatus and implemented by the user apparatus. The method including: deactivating, for at least one encrypted communication of the user apparatus with a remote device via a network, at least one encryption procedure selected by the user apparatus and implemented with a first entity of the network involved in routing data exchanged between the user apparatus and the remote device during the encrypted communication, the data being subject to at least one other encryption procedure separate from the at least one deactivated encryption procedure.

20 Claims, 6 Drawing Sheets

(51) Int. Cl.
*H04W 12/08* (2021.01)
*H04W 12/37* (2021.01)
*H04W 76/12* (2018.01)

(58) Field of Classification Search
CPC .. H04W 12/037; H04W 92/04; H04L 63/166; H04L 63/0428; H04L 63/205
See application file for complete search history.

(56) References Cited

U.S. PATENT DOCUMENTS

| | | | |
|---|---|---|---|
| 2007/0043940 | A1 | 2/2007 | Gustave et al. |
| 2010/0257355 | A1 | 10/2010 | Shinozaki |
| 2016/0050561 | A1* | 2/2016 | Pudney ............... H04W 12/041 713/171 |
| 2017/0374025 | A1* | 12/2017 | Pan ....................... H04L 63/164 |
| 2020/0008049 | A1* | 1/2020 | Namiranian ...... H04W 12/0433 |

OTHER PUBLICATIONS

Banks Microsoft Corporation: "QUIC Disable Encryption; draft-banks-quic-disable-encryption-00.txt", QUIC Disable Encryption; draft-banks-quic-disable-encryption-00.txt; Internet-Draft: Network Working Group, Aug. 11, 2020 (Aug. 11, 2020), pp. 1-5, XP015141079 (Year: 2020).*
International Search Report dated Jan. 10, 2022 for corresponding International Application No. PCT/FR2021/051663, filed Sep. 27, 2021.
Written Opinion of the International Searching Authority dated Jan. 10, 2022 for corresponding International Application No. PCT/FR2021/051663, filed Sep. 27, 2021.
English translation of the Written Opinion of the International Searching Authority dated Jan. 18, 2022 for corresponding International Application No. PCT/FR2021/051663, filed Sep. 27, 2021.
3rd Generation Partnership Project; Technical Specification Group Services and System Aspects; Study on Access Traffic Steering, Switch and Splitting support in the 5G system architecture Phase 2 (Release 17), Sep. 9, 2020 (Sep. 9, 2020), 3GPP Draft; 23700-93-100, 3rd Generation Partnership Project (3GPP), Mobile Competence Centre ; 650, Route Des Lucioles ; F-06921 Sophia-Antipolis Cedex ; France Retrieved from the Internet: URL:https://ftp.3gpp.org/tsg_sa/WG2_Arch/Latest_SA2_Specs/.
Banks Microsoft Corporation N, "Quic Disable Encryption; draft-banks-quic-disable-encryption-00.txt", Aug. 11, 2020 (Aug. 11, 2020), p. 1-5, Quic Disable Encryption; Draft-Banks-Quic-Disable-Encryption-00.TXT; Internet-Draft: Network Working Group, Internet Engineering Task Force, IETF; Standardworkingdraft, Internet Society (ISOC) 4, Rue Retrieved from the Internet: URL:https://tools.ietf.org/html/draft-banks-quic-disable-encryption-00, XP015141079.
Huawei et al, "KI #2, Sol #8: Update QUIC solution to solve ENS", vol. SA WG2, No. e-meeting; Aug. 19, 2020-Sep. 1, 2020, Sep. 2, 2020 (Sep. 2, 2020), 3GPP Draft; S2-2006287, 3rd Generation Partnership Project (3GPP), Mobile Competence Centre ; 650, Route Des Lucioles ; F-06921 Sophia-Antipolis Cedex ; France Retrieved from the Internet: URL:https://ftp.3gpp.org/tsg_sa/WG2_Arch/TSGS2_140e_Electronic/Docs/S2-2006287.zip.
"3rd Generation Partnership Project; Technical Specification Group Services and System Aspects; Study on access traffic steering, switch and splitting support in the 5G system architecture (Release 16)", Technical Report, 3GPP TR 23.793 V16.0.0 (Dec. 2018).
"3rd Generation Partnership Project; Technical Specification Group Services and System Aspects; System architecture for the 5G System (5GS); Stage 2 (Release 16)", Technical Specification, 3GPP TS 23.501 V16.5.1 (Aug. 2020).
J. Iyengar et al., "Quic: A UDP-Based Multiplexed and Secure Transport", Internet-Draft: draft-ietf-quic-transport-28, May 20, 2020.
M. Boucadair et al., "3GPP Access Traffic Steering Switching and Splitting (ATSSS)—Overview for IETF Participants draft-bonaventure-quic-atsss-overview-00", May 30, 2020.
Japanese Notice of Reasons for Rejection dated Apr. 22, 2025 for corresponding Japanese Application No. 2023-519373.

* cited by examiner

[Fig 1]
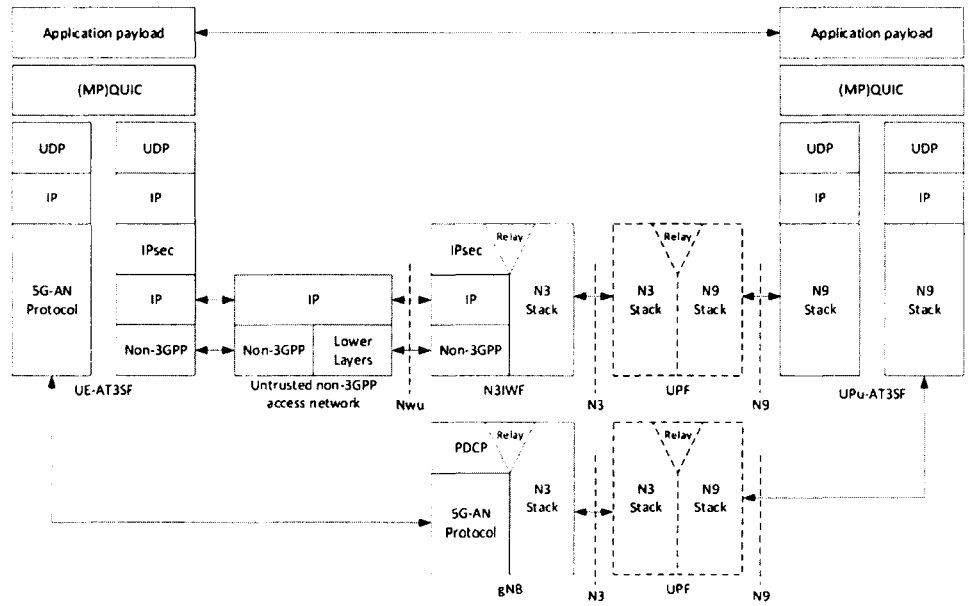
[Fig 2]
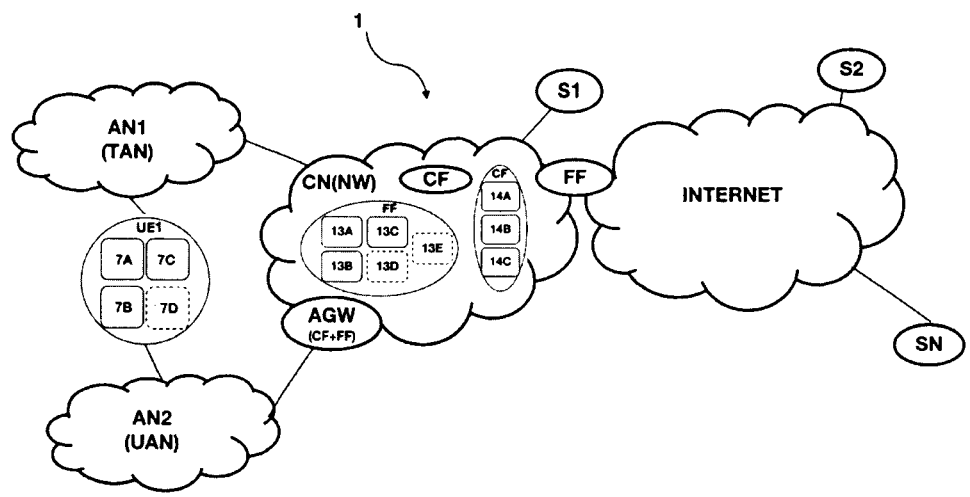

[Fig 3]
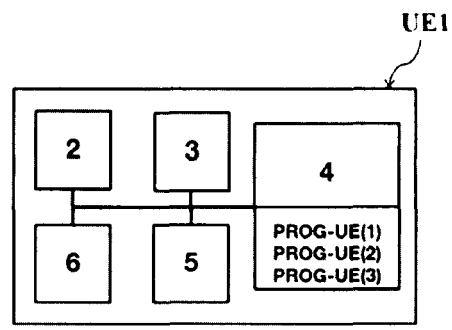
[Fig 4]
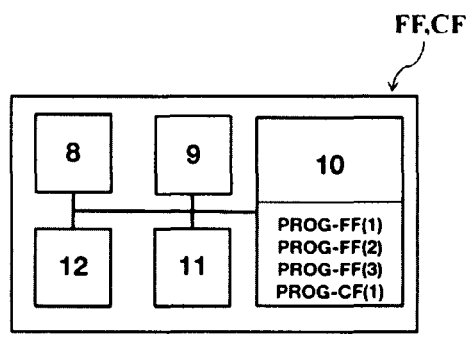
[Fig 9]
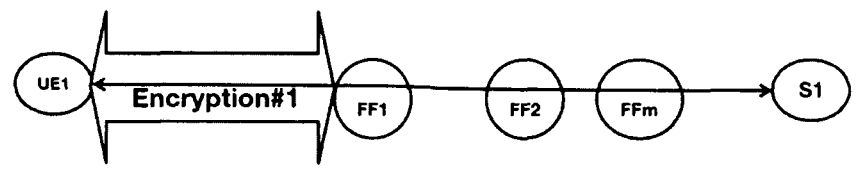

[Fig 5A]
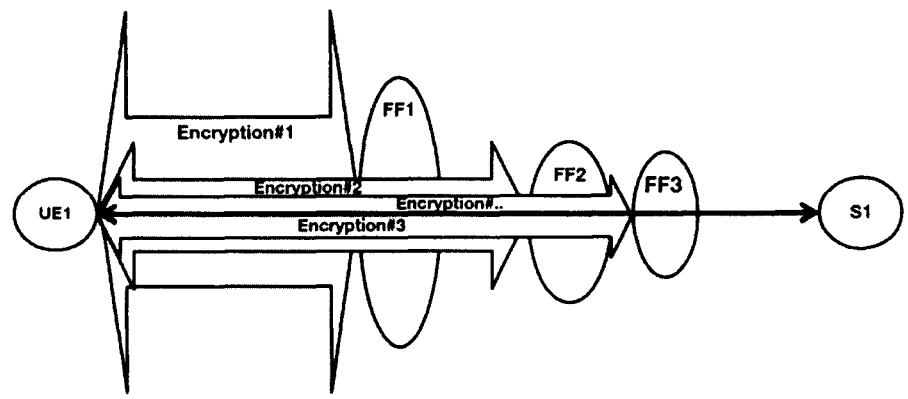
[Fig 5B]
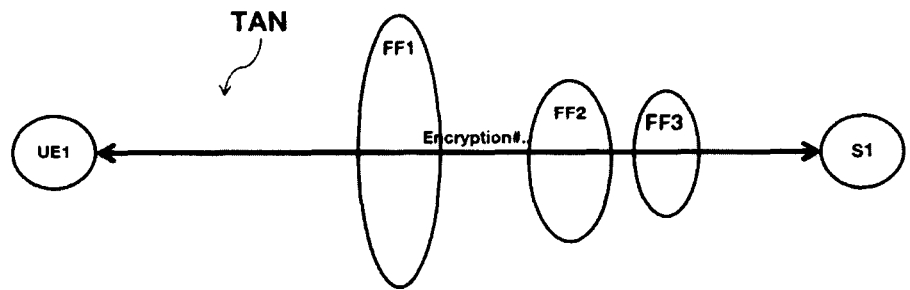
[Fig 5C]
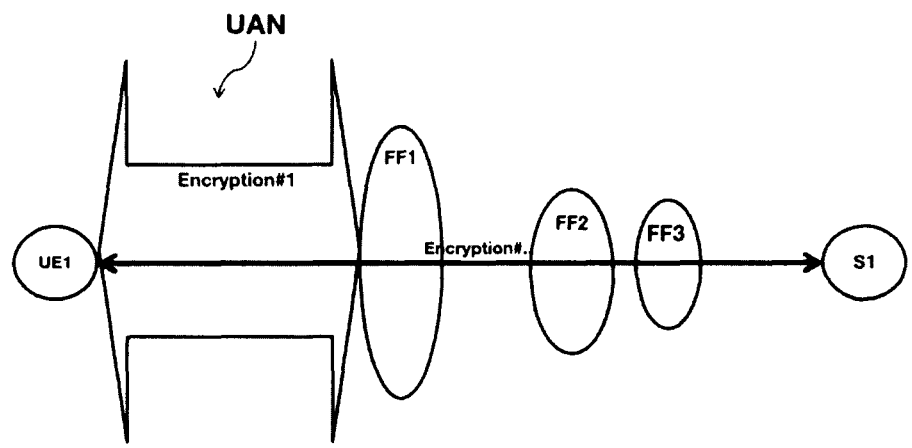

[Fig 6A]
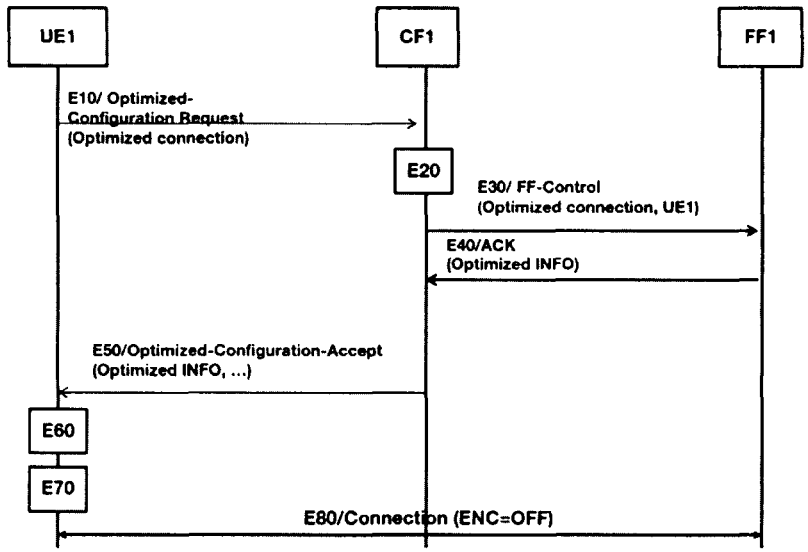
[Fig 6B]
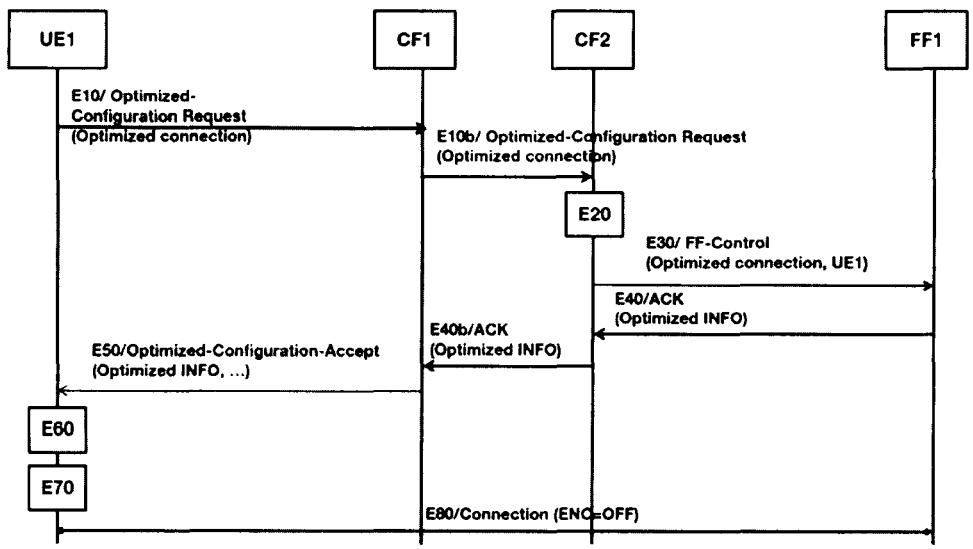

[Fig 7]
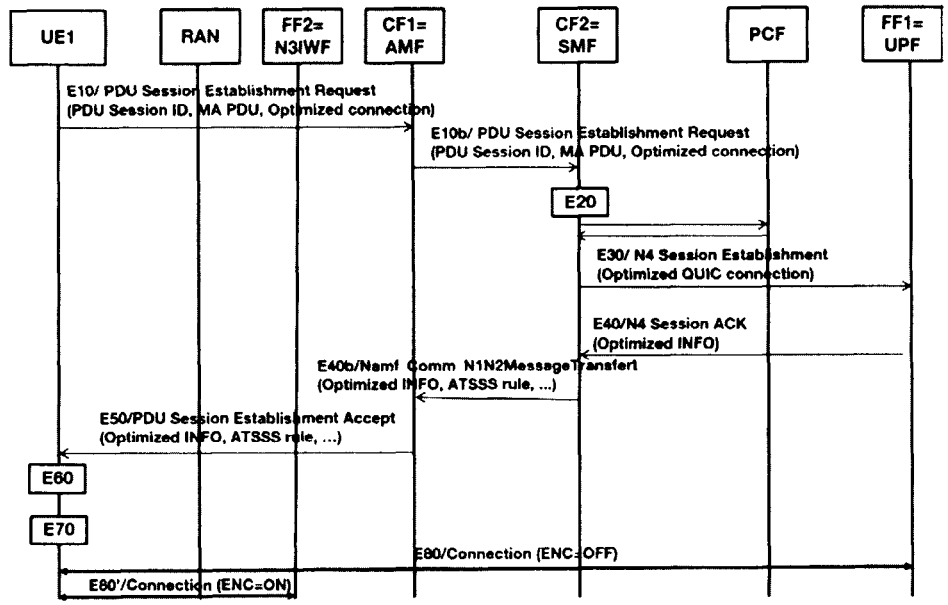
[Fig 8]
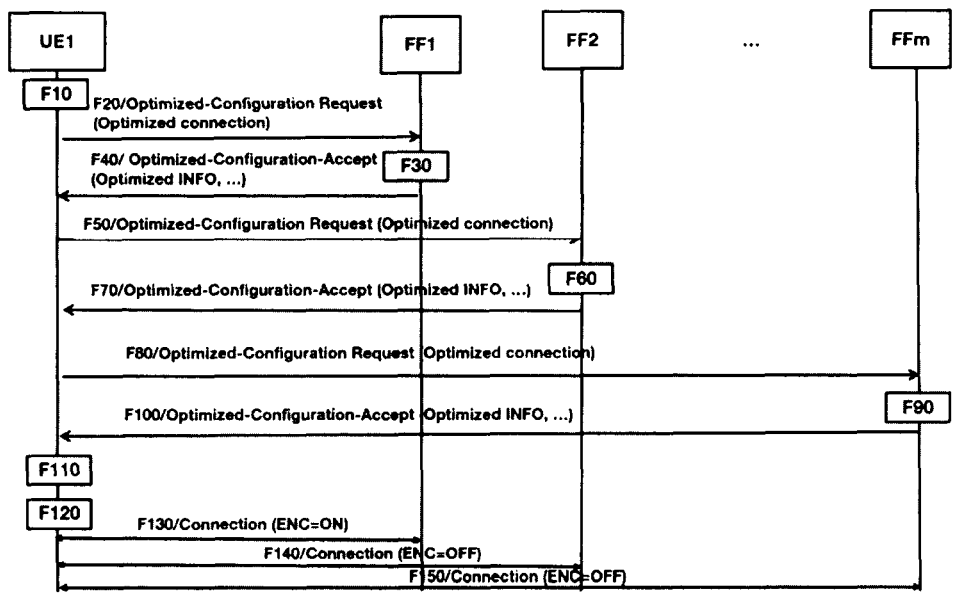

[Fig 10A]
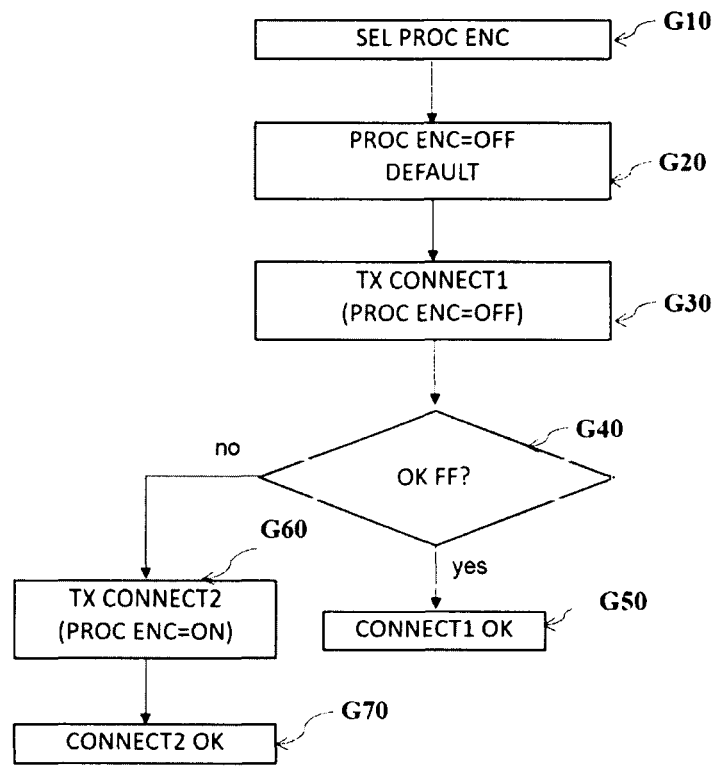
[Fig 10B]
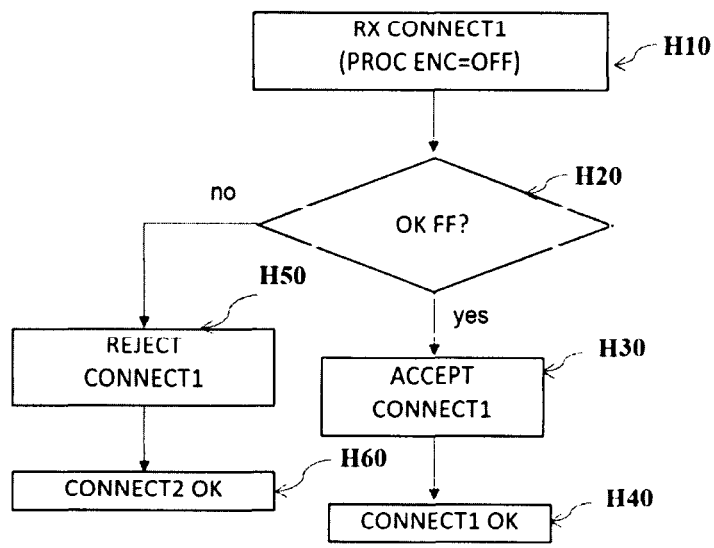

METHODS FOR CONFIGURING A USER APPARATUS, NEGOTIATING WITH A NETWORK ENTITY, AND MANAGING A CONNECTION, AND ASSOCIATED DEVICES

CROSS-REFERENCE TO RELATED APPLICATIONS

This Application is a Section 371 National Stage Application of International Application No. PCT/FR2021/051663, filed Sep. 27, 2021, the content of which is incorporated herein by reference in its entirety, and published as WO 2022/069825 on Apr. 7, 2022, not in English.

PRIOR ART

The invention relates to the general field of telecommunications.

More specifically, it relates to the management of encrypted communications in a telecommunications network. The invention has a preferred application, in particular within the context of a 5G telecommunications network as defined by the 3GPP (Third Generation Partnership Project) standard. However, it also can be applied within the context of another network, such as a 4G network, a proprietary network, etc.

The user equipments of the telecommunications networks, and in particular the terminals, such as smartphones or personal computers (or PC), are now capable of activating and operating several logical interfaces linked to one or more physical interfaces, so that they may or may not simultaneously connect to various types of network (for example, fixed network, mobile network, wireless local area network) via various IP (Internet Protocol) addresses. Such user equipments are called "Multi-InterFaces" (or MIF).

It should be noted that the MIF feature of a user equipment is volatile since its ability to use several interfaces depends on the conditions for connecting to the one or more networks, its location, or even other factors. An MIF user equipment can particularly use all or of interfaces it has available when some the establishing a simple connection with a correspondent (i.e., established along a single path with this correspondent), or even after establishing a simple connection. Moreover, it also should be noted that an MIF user equipment does not know a priori whether it is possible to use several distinct paths to establish communication with a given correspondent: the user equipment only acquires this information, if applicable, on completion of a which it attempts to establish communication with the correspondent by using multiple paths.

When a user equipment has several interfaces capable of connecting it to various access networks (for example, fixed, mobile, WLAN (Wireless Local Area Network)) in order to connect to a core network, it then benefits from access that is referred to as "hybrid" access, combining different access network technologies. The offers of services concerning a user equipment having a hybrid access rely on introducing functions into the core network that allow all the network connections of a user equipment to be aggregated (for example: WLAN and 4G, or ADSL, WLAN and 5G). It should be noted that aggregating links involves consolidating several links associated with several logical interfaces as if it were a single link associated with a single interface, in particular with the aim of increasing the throughput beyond the limits of a single link, of applying the same operating procedures to all the links thus aggregated, of distributing the traffic between several links, or even of causing other interfaces (and therefore other access networks) to take over if these one of links fails (redundancy principle). Link aggregation applies to any type of traffic routed along these links, including IP traffic.

The MPTCP (Multi-Path Transmission Control Protocol) protocol was initially proposed to address the requirements raised by a context where a user equipment is able to connect to a network via several interfaces in communication based on the TCP order to establish protocol. The MPTCP protocol particularly addresses the requirements of ensuring clear session continuity for the user in the event of any mobility of the user equipment. By way of a reminder, the TCP connections of a user equipment are identified by an IP address and a port number, so that any modification of this identification information is likely to be detrimental to the operation of an ongoing TCP connection, and thus the service using said TCP connection. Such a change in IP address or port number is particularly detrimental when the user equipment is assigned a new IP address, or because the user equipment is connected to another network, or even when the interface with which the IP address is associated is no longer available. Means for notifying the remote TCP correspondent that an IP address is no longer valid are then necessary to ensure that an existing connection is maintained (for example, in the case of long duration TCP connections). The MP TCP protocol has been proposed particularly in order to minimize the risks of the untimely interruption of the TCP connections linked to such modifications of the IP addressing.

However, the MPTCP protocol is only a partial solution to the general problem of aggregating links because, by definition, it does not allow connections to be established using a transport protocol other than TCP on multiple paths, such as, for example, the UDP (User Datagram Protocol) transport protocol or other transport protocols.

However, several transport protocols have been proposed, which are standardized and implemented by the Internet community in order to meet the requirements of the applications. For example, some applications require more transport functions than those offered by the TCP protocols, whereas others consider that the and UDP functions offered by TCP or UDP are not (all) transport given their requirements. The transport necessary functions are defined as being the list of services offered by a protocol used to multiplex connections on the transport layer. This list contains, for example, the ordered transmission of the reliable the data, transmission of the data, congestion control, or integrity checking.

It is for this reason that:
the SCTP (Stream Control Transmission Protocol) protocol has been specified to meet the requirements of the applications that require more transport functions than those supported by TCP such as, typically, preserving the structure of the data as generated by the application or supporting communications via multiple paths;
the DCCP (Datagram Congestion Control Protocol) protocol is another transport protocol that has been specified for applications that require more transport functions than those supported by UDP (such as, for example, supporting congestion control), but without necessarily inheriting the constraints of a connection-oriented protocol such as TCP (such as, for example, ensuring reliable transmission);
the UDP-lite protocol is a simple version of the UDP protocol that has been proposed for applications that do not require all the functions offered by UDP (such as, for example, integrity checking), whereas TLS (Transport Layer Security) and DTLS the (Datagram TLS) protocols have been standardized for the encryption requirements of the applications on the transport layer;

the QUIC protocol is a protocol that is based on the UDP transport protocol and that is intended to reduce the latency times generally observed when establishing TCP connections, while avoiding the problems of blocking (or Head-of-line blocking);

etc.

Given that TCP and UDP are the two transport protocols mainly used by the applications for communicating over the Internet, link aggregation should form part of the functions supported by UDP, echoing what is supported by TCP. Thus, the 3GPP standard has edited, for 5G networks, the TR 23.793 report entitled "3GPP; Technical Specification Group Services and System Aspects; Study on access traffic steering, switch and splitting support in the 5G system architecture", Release 16, v16.0.0, December 2018, the purpose of which was to study how a 5G network (or 5G System (5GS)) can be modified to support the link aggregation functions, called ATSSS (Access Traffic Steering, Switching and Splitting) in the 3GPP report, between 3GPP access networks and other non-3GPP access networks. All the ATSSS functions deployed in a 5G core network (or more simply in the "5G network" suite) must be able to be used to route the TCP traffic and the UDP traffic (including the QUIC traffic).

One solution specific to the TCP protocol was thus introduced into 3GPP document IS 23.501 entitled "3GPP; Technical Specification Group Services and System Aspects; System architecture for the 5G System (5GS); Stage 2", Release 16, v16.5.1, August 2020. This solution is based on the MPTCP and Convert Protocol (described in document RFC 8803 edited by the IETF) protocols. The 3GPP study of the solutions for offering the ATSSS functions to non-TCP traffic, such as, for example, traffic conveyed by the QUIC protocol, which in 2020 represents a significant share of the traffic, are based on the UDP protocol.

In a known manner, QUIC not only encrypts the payload data but also the control information of a connection; the QUIC information that is sent unencrypted is limited to the absolute minimum, and includes, for example, the connection identifier. As a result, the known solutions that are based on the MPTCP protocol and on the assistance of the network are not reusable for the QUIC protocol, since the QUIC traffic cannot be intercepted by network due to its encryption. Moreover, the QUIC protocol uses only a single path at a time to send the data packets relating to the same connection, which does not meet the requirements of the ATSSS functions defined by the 3GPP standard.

The options that are currently being studied by the 3GPP to offer ATSSS functions in conjunction with the QUIC protocol are briefly disclosed in the document by M. Boucadair et al., entitled "3GPP Access Traffic Steering Switching and Splitting (ATSSS)—Overview for IETF Participants", 30 May 2020 (hereafter referred to as document D1). In this document D1, a reference architecture is considered, according to which a user equipment is attached to two different access networks (including at least one 3GPP network of an operator of a 5G core network, with the other network being able to be managed by a separate administrative entity), and interacts with a remote server. This interaction occurs via an ATSSS UPF (User Plane Function) function, located in the 5G network of the operator and responsible for associating the data received from the user equipment via the various access networks (in other words, via various paths) and for relaying them to the remote server.

Document D1 describes three options using the QUIC protocol as an encapsulation mechanism between the user equipment and the ATSSS UPF function located in the network of the operator, for any type of traffic (TCP, UDP, IP, QUIC, etc.). According to these options, the QUIC connections established between the user equipment and the ATSSS UPF function are either simple connections (i.e., each of these connections is established according to the basic QUIC procedure described in the document by J. Iyendar et al., entitled "QUIC: A UDP-based Multiplexed and Secure Transport", draft-ietf-quic-transport, May 2020), or connections established according to a new extension to the QUIC protocol defined to support the QUIC connections via multiple paths. When simple QUIC connections are used, an application function associating the various connections with one another is then necessary.

The three options that are currently discussed by the 3GPP nevertheless suffer from the following disadvantages.

The use of the QUIC protocol as an encapsulation mechanism between the user equipment and the ATSSS UPF function induces a surplus (also called "overhead") relative to the various encapsulation mechanisms already present in the 3GPP networks. FIG. 1 illustrates the required protocol stacks (and the resulting encapsulation schemes) on each entity of the aforementioned reference architecture (user equipment UE, N3IWF (Non-3GPP InterWorking Function) and UPF entities of the 5G network of the operator, gNB base station and remote server) for implementing the ATSSS UPF function, as a function of the access network used by the user equipment UE to connect to the 5G (3GPP access network (or "5G-AN" for 5G Access Network) or non-3GPP access network, such as a WLAN network, for example).

By way of an example, if the QUIC connection between the user equipment UE and the UPF function is established via a non-3GPP WLAN access network, an overhead of 142 bytes is observed at least for IPV6 packets sent by a user equipment. Such an overhead can cause the transmission of ICMP (Internet Control Message Protocol) PTB (Packet Too Big) messages or the fragmentation of the transmitted packets if, for example, the Maximum Transmission Unit, or MTU, defined for the path taken has not been modified in order to take into account the overhead by induced the various encapsulations and to avoid the fragmentation of the packets likely to be detrimental to the integrity of the communication.

In addition to the overhead, the use of a QUIC encapsulation mechanism induces the implementation of a new encryption scheme, which is added to the already existing encryption schemes and is implemented by the other layers (for example, on the application level, on the transport level, on the physical layer level). These multiple encryptions can affect the performance capabilities of the communications, in particular those of the user equipment, due to the processing times and the computations that are implemented.

Thus, typically, the QUIC packets sent via a 3GPP access network undergo two encryptions in addition to the encryption carried out on the radio level, namely, the encryption that is required between the user equipment and the remote server and the encryption that is required by the QUIC connection between the user equipment and the ATSSS UPF function. The QUIC packets sent via a non-3GPP access network for their part undergo a third additional encryption that is required between the user equipment and the N3IWF function, which is responsible for relaying the messages received from a non-3GPP access network to the 5G core network.

SUMMARY

The invention proposes a mechanism that advantageously allows, according to the contemplated embodiment, all or some of the previously highlighted disadvantages of the prior art to be addressed within the context of a 5G telecommunications network and an ATSSS UPF transport function located in the network that allows multiple communication paths to be managed that an the MIF user equipment can benefit from in order to communicate with a remote device, irrespective of the transport protocol that is used (and in particular not only TCP). However, it should be noted that although the technical problem has been described within this particular context with reference to the QUIC protocol, the invention is applicable in other contexts, and in particular to networks other than a 5G network (for example, to a 4G network), to functions other than an ATSSS function (for example, a TCP/HTTP acceleration function), as well as to protocols other than the QUIC protocol (for example, to the TLS, DTLS, IPsec (Internet Protocol security) security protocols).

More specifically, the invention proposes, according to a first aspect, a method for configuring a user equipment, method is intended to be which implemented by this user equipment and comprises a step of deactivating, for at least one encrypted communication of the user equipment with a remote device via a network, at least one encryption procedure selected by the user equipment and implemented with a first entity of the network involved in routing data exchanged between the user equipment and the remote device during the encrypted communication, with this data being subject to at least one other encryption procedure distinct from said at least one deactivated encryption procedure.

Correspondingly, the invention also relates to a user equipment of a telecommunications network comprising a deactivation module, configured to deactivate, for at least one encrypted communication of the user equipment with a remote device via the network, at least one encryption procedure selected by this user equipment and implemented with a first entity of the network involved in routing data exchanged between the user equipment and the remote device during the encrypted communication, with this data being subject to at least one other encryption procedure distinct from said at least one deactivated encryption procedure.

It should be noted that the expression "encryption procedure" is used herein to equally designate encryption and decryption operations implemented between the user equipment and the first entity. Deactivating an encryption procedure on the user equipment is clearly reflected by the deactivation of the corresponding decryption procedure on the first entity, and conversely in the case of two-way communications, between the user equipment and the first entity.

There are no limitations to the nature of the considered user equipment (or UE), or to that of the remote device. The user equipment can be a fixed or mobile terminal, such as, for example, a personal computer or a smartphone capable of connecting to the network via one or more access networks, or even equipment of the CPE (Customer Premises Equipment) type connected to the network via at least one access network, etc. The remote device can designate any termination point of the communication with the user equipment, such as, for example, a server, hosted by the network or by another network, or another user equipment, etc. There are no assumptions concerning the structure of this remote equipment, which equally can be hardware or software.

Thus, the invention offers a user equipment the possibility of deciding, on its own initiative, whether to deactivate, during its communications with remote devices via the network, one or more encryption procedures implemented when routing the data exchanged with these remote devices. This deactivation is possible on the condition that at least one alternative encryption procedure exists to protect the data exchanged with the remote device, with this procedure being applicable to any level of the layers of the OSI (Open Systems Interconnection) model (physical, transport, application layer, etc.). For example, this alternative encryption procedure can be:

an encryption procedure implemented with another entity of the network involved in routing the data; and/or an encryption procedure implemented on a network used by the user equipment to exchange said data with the remote device, such as, for example, on an access network; and/or an encryption procedure implemented with the remote device to exchange said data.

The user equipment can thus deactivate all or some of the redundant encryption procedures implemented in the network, while preserving the security of its communications, that of the core network, but also of the remote device. This deactivation allows the resources of the user equipment to be saved (for the processing required for encrypting/decrypting the data). This results in optimization of the overall performance capabilities of the user equipment and of the communications (in particular via the optimization of the load of the intermediate equipment).

According to the invention, it is the user equipment that selects the encryption procedures to be deactivated. This selection can occur as a function of various information, which particularly can originate from the network (transmitted, for example, to the user equipment in the form of rules or in any other form), and in particular entities involved in routing the data themselves (sometimes referred to as "transport functions or entities" hereafter) or entities capable of controlling and configuring these entities (sometimes referred to as "control functions or entities" hereafter). However, only the user equipment has a comprehensive enough view concerning the number and the nature of the transport functions that will be requested during a communication (for example, link aggregation), and therefore concerning the encryption procedures and the encapsulations resulting therefrom, with the network not having this knowledge a priori. By virtue of this knowledge, the user equipment is able to identify the encryption procedures, but also the encapsulation procedures that are redundant during a communication, and is able to deactivate all or some of these procedures, if applicable.

Therefore, the invention advantageously allows the encapsulation procedures to be optimized that are typically implemented in a 3GPP network and that result in the establishment of tunnels. Throughout the remainder of the description, the establishment of tunnels explicitly refers to such encapsulation procedures.

Thus, in a particular embodiment, the deactivation step can also comprise the deactivation of a procedure for establishing a tunnel with the first entity.

The user equipment can decide upon this deactivation of the establishment of a tunnel with the first entity as long as the routing of the data involves this first entity (notion of "traffic engineering" or "traffic steering"). This particularly can be the case when a tunnel responsible for routing the data so that it passes through this first entity already exists, or when routing data via the first entity is provided by routing options to the source, where the source transmitting data is able to explicitly indicate the one or more entities by which the data must pass (for example, "Segment Routing").

Deactivating one or more encapsulation procedures resulting in the establishment of a tunnel also allows the overhead to be reduced that is induced by encapsulating the data passing through these tunnels, as well as the time required to establish these tunnels. Furthermore, this embodiment assists the optimization of the overall performance capabilities of user equipment and of the communications (for example, by avoiding fragmentation of the packets).

It should be noted that, in another embodiment, the user equipment can decide to deactivate a procedure for establishing a tunnel with an entity distinct from the first entity with which it decided to deactivate an encryption procedure. In other words, in the same way that deactivating encryption procedure(s) and deactivating tunnel establishment procedure(s) are not mutually exclusive, the user equipment can also decide upon them independently and on separate connections.

The invention generally allows the user equipment to control the level of security that it wishes to associate with an encrypted communication with a remote device. For example, depending on the reputation of the access network it that wishes to use during this encrypted communication, it may or may not decide to deactivate one or more redundant encryption procedures during this encrypted communication.

Although the invention applies to any type of transport function involved in routing data between a user equipment and a remote device, it has a preferred application within the previously introduced context of functions managing link aggregation, such as, for example, the ATSSS UPF function defined by the 3GPP standard, and the use of secure protocols based on protocols other than the TCP protocol (for example, UDP or QUIC). When applied within this context, the invention effectively allows a functional parity to be contemplated between the TCP and UDP protocols for managing communications established on multiple paths.

Typically, deactivating certain encryption and/or encapsulation procedures, implemented by the solutions documented in the 3GPP standard and based on the encapsulation of the data packets with the QUIC protocol, offers the possibility of establishing communications using multiple paths in a comparable manner to that implemented for TCP, with the assistance of the network, and without adding an additional delay due to multiple QUIC encryptions and encapsulations that are required by these solutions. It is thus possible to benefit from the advantages of link aggregation, while optimizing the engineering and the use of the tunnels, and more generally to provide a service similar to the TCP traffic for the non-TCP traffic however described (UDP, QUIC, etc.), hence this functional parity.

In a particular embodiment, step the of deactivating said at least one encryption procedure and/or tunnel establishment procedure is conditional upon receiving a prior authorization originating from a second entity of the network, and requested by the user equipment.

Correspondingly, in this embodiment, the deactivation module is configured to deactivate said at least one encryption procedure following a prior authorization received from a second entity of the network and requested by the user equipment.

The second entity of the network requested by the user equipment can be, for example, the first entity with which the user equipment wishes to deactivate the encryption procedure and/or the tunnel establishment procedure, or a network control entity capable of configuring the first entity to deactivate this encryption procedure and/or this tunnel establishment procedure, or even another network control entity capable of relaying the request for authorization from the user equipment to this control entity.

Thus, in this embodiment, deactivating the encryption procedure and/or the tunnel establishment procedure follows a prior negotiation with the network, on the initiative of the user equipment. The request from the user equipment to acquire the authorization of the network can occur at various times, for example, when attaching the user equipment to the network, when activating a network session, at a regular interval, upon the explicit activation of the user or of an application via a dedicated interface or API (Application Programming Interface), etc.

The authorization can be explicit or implicit, intended for an encryption procedure and/or a tunnel particular or, on the establishment procedure in contrary, can involve more general rules provided by the network concerning the encryption and/or tunnel establishment procedures that can be deactivated by the user equipment with transport functions of the network during its communications.

This embodiment allows the network operator to maintain control over the procedures that can be deactivated, in particular in order to maintain the security of their network and/or to comply with certain operator policies. Furthermore, this allows coordination of the user equipments with the network.

Within the context of communications using multiple paths, the operator can thus control the management of these communications, and maintain the security of the network by preventing the ATSSS service from being used by unauthorized user equipments. Furthermore, coordination with the network simplifies the use of QUIC clients.

In a particular embodiment, the configuration method comprises, prior to the deactivation step, a step of receiving, originating from the second entity of the network, at least one item of information, called deactivation context information (namely of one or more encryption procedures and/or one or more tunnel establishment procedures), providing at least one indication concerning at least one encryption procedure and/or at least one tunnel establishment procedure that can be deactivated by the user equipment.

For example, said at least one item of deactivation context information can include at least one indication of:
- at least one entity of the network with which an encryption procedure and/or a tunnel establishment procedure can be deactivated (for example, an ATSSS UPF function); and/or
- at least one type of connection during which one such procedure can be deactivated (for example, a QUIC connection used to establish a secure tunnel or an IPsec tunnel established with the remote device); and/or
- at least one access network for accessing said network for which one such procedure can be deactivated (for example, a 3GPP access network).

As a variant or in addition, the network can also provide the user equipment with indications concerning the encryption and/or tunnel establishment procedures that cannot be deactivated.

There are no limitations to the form of the deactivation context information that the user equipment is provided with by the second entity of the network. This information can be integrated, for example, into rules (such as ATSSS rules defined in the 3GPP standard), with each rule being able to specify several elements to which the rule applies, such as, in particular, the nature of the access network interface (for example, 3GPP or non-3GPP), the identifier of the application, the first entity of the network (for example, ATSSS UPF entity), whether or not it is possible to deactivate the encryption procedure and/or the tunnel establishment procedure implemented with this first entity of the network, etc. Of course, this example is provided solely by way of an illustration and other deactivation context information, presented in other forms, can be contemplated.

Thus, for example, the deactivation context information can include a security key intended to be presented by the user equipment to the first entity of the network with which the encryption procedure and/or the tunnel establishment procedure is deactivated.

Such a security key allows the first entity to carry out security checks with the user equipment, and in particular to ensure that the latter is indeed authorized by the network to deactivate the one or more procedures in question. In a particular embodiment, the checking key is only presented when establishing a connection with or via the first entity.

In a particular embodiment, said at least one encryption procedure and/or tunnel establishment procedure selected by the user equipment is (are) selected as a function of said at least one item of deactivation context information received from the second entity.

As mentioned above, this ensures that the selection made by the user equipment is coordinated with the network and remains under its control.

In the embodiments that have been mentioned above, deactivating the encryption procedure and/or the tunnel establishment procedure selected by the user equipment follows a prior negotiation with the network. As a variant, it is possible to contemplate the user equipment by default deactivating an encryption procedure and/or a tunnel establishment procedure in order to communicate with the remote device via the first entity, and as a function of the response from the first entity, adapting, if necessary, this operating mode by re-establishing the encryption procedure and/or the tunnel establishment procedure deactivated by default.

More specifically, in accordance with this variant, it is possible, for example, to contemplate that the configuration method comprises, following the deactivation step:
  a step of requesting the establishment of a first connection with or via the first entity, in which step the encryption procedure and/or the tunnel establishment procedure is (are) deactivated; and
  in the event of the rejection of said first connection by the first entity, a step of requesting the establishment of a second connection with or via the first entity, in which step the encryption procedure and/or the tunnel establishment procedure is (are) activated between the user equipment and the first entity.

Correspondingly, in this embodiment, said user equipment further comprises a communication module configured for:
  requesting the establishment of a first connection with or via the first entity in which said encryption procedure and/or the tunnel establishment procedure is/are deactivated; and
  in the event of the rejection of said first connection by the first entity, requesting the establishment of a second connection with or via the first entity which said encryption procedure and/or the tunnel establishment procedure is/are activated between the user equipment and the first entity.

There are no limitations to the form that can be assumed by the rejection of the first connection by the first entity. For example, it can be an error message, a refusal message, etc. If the first connection is accepted by the first entity, then the user equipment continues to use this first connection to transmit its data via the first entity to the remote device, in other words, the unencrypted connection (optionally carried out via an unencrypted tunnel) that it established with or via the first entity.

It should be noted that the prior negotiation with the network and the default deactivation are not mutually exclusive: the user equipment can, for certain transport functions, set up a negotiation with the network, while others it can deactivate the encryption and/or with encapsulation procedures by default. The invention offers significant flexibility depending on the context in which it is applied.

In view of the above, it is clearly apparent that the invention relies on the user equipment, but also on the first and second entities of the network.

Thus, according to a second aspect, the aim of the invention is a method for negotiating between an entity, called second entity, of a network and a user equipment of said network, said method comprising:
  a step of receiving, by the second entity, an authorization request by the user equipment for deactivating, for at least one encrypted communication of the user equipment with a remote device via said network, at least one encryption procedure implemented with at least one entity, called first entity, of the network involved in routing data exchanged between said user equipment and said remote device during said encrypted communication;
  if the request is accepted, a step of sending, by said second entity, at least one item of information, called deactivation context information, intended for said user equipment, with said at least one item of information providing at least one indication concerning at least one of said encryption procedures that can be deactivated by said user equipment.

Correspondingly, the invention also relates to an entity, called second entity, of a network comprising:
  a reception module, configured to process an authorization request by a user equipment of said network to authorize the deactivation, for at least one encrypted communication of the user equipment with a remote device via said network, at least one encryption procedure implemented with at least one entity, called first entity, of the network involved in routing data exchanged between said user equipment and said remote device during said encrypted communication;
  a sending module, activated if the request is accepted, and configured to send at least one item of information, called deactivation context information, intended for said user equipment, with said at least one item of information providing at least one indication concerning at least one of said encryption procedures that can be deactivated by said user equipment.

In a particular embodiment, the negotiation method further comprises a step of configuring, by the second entity, the first entity of the network in order to process data exchanged between the user equipment and the remote device during the encrypted communication when an encryption procedure with the first entity is deactivated by the user equipment.

Correspondingly, in this embodiment, the second entity further comprises a configuration module, programmed to configure the first entity of the network to process data exchanged between said user equipment and said remote device during said encrypted communication when an encryption procedure with said first entity is deactivated by said user equipment.

It should be noted that the authorization request can also relate to a procedure for establishing a tunnel with the first entity as described above, and, if applicable, said at least one item of deactivation context information comprises at least one indication concerning one of said tunnel establishment procedures that can be deactivated and the configuration module of the second entity can be capable of configuring the first entity so that it is capable of processing data passing through it without being encapsulated: order to be routed via this tunnel.

According to a third aspect, the invention relates to a method for managing a connection of a user equipment of a network by a first entity of the network, with this first entity being involved in routing data exchanged between the user equipment and a remote device during an encrypted communication, with this management method comprising:
  a step of receiving, from the user equipment, a request to establish a first connection with or via the first entity, in which step at least one encryption procedure between the first entity and said user equipment, selected said user equipment, is deactivated;
  if the first entity accepts the establishment of the first connection, a step of processing data exchanged, during said encrypted communication, between said user equipment and said remote device via said first connection;
  otherwise, a step of processing data exchanged, during the encrypted communication, between the user equipment and the remote device via a second connection established by the user equipment with or via the first entity, in which step said encryption procedure is activated between the user equipment and the first entity.

It should be noted that the acceptance of the second connection can be explicit or implicit as long as the first entity does not reject this second connection and processes the data exchanged via this second connection. In other words, the step of processing the data exchanged via the second connection conveys the acceptance of the second connection by the first entity.

Correspondingly, a further aim of the invention is an entity, called first entity, of a network likely to be involved in routing data exchanged between a user equipment of the network and a remote device during an encrypted communication, with this first entity comprising:
  a deactivation module configured to deactivate, during said encrypted communication, an encryption procedure with the user equipment, selected by said user equipment; and
  a processing module configured to process data exchanged during said encrypted communication between the user equipment and the remote device, and passing through the first entity.

In a particular embodiment, the first entity comprises:
  a first processing module, configured to process an establishment request, received from the user equipment, to establish a first connection with or via the first in which at entity least one encryption procedure between the first entity and said user equipment, selected by said user equipment, is deactivated during said encrypted communication;
  a second processing module, activated if the establishment request is accepted, and configured to process data exchanged, during the encrypted communication, between the user equipment and the remote device via said first connection; and
  a third processing module, activated if the establishment request is rejected, and configured to process data exchanged, during said encrypted communication, between the user equipment and the remote device via a second connection established by the user equipment in which said encryption procedure is implemented between the user equipment and the first entity.

It should be noted herein that the user equipment can also decide to deactivate, during the first connection, a procedure for establishing a tunnel with the first entity, in which case the second processing is, module of the first entity if the establishment request for establishing the first connection is accepted, configured to process data that are not encapsulated according to said deactivated procedure. If the establishment request to establish the first connection is rejected, then the user equipment establishes a second connection in which the encryption procedure and/or the procedure for establishing a tunnel with the first entity is (are) re-established.

In a particular embodiment of the invention, the configuration, negotiation and management methods are implemented by a computer.

A further aim of the invention is a computer program on a recording medium, with this program being capable of being implemented in a computer, or more generally in a user equipment according to the invention, and comprises instructions adapted for implementing a configuration method as described above.

A further aim of the invention is, according to a fourth aspect, a computer program on a recording medium, with this program being capable of being implemented in a computer, or more generally in a "first" entity of the network according to the invention, and comprises instructions adapted for implementing a method for managing a connection as described above.

A further aim of the invention is a computer program on a recording medium, with this program being capable of being implemented in a computer, or more generally in a "second" entity of the network according to the invention and comprises instructions adapted for implementing a negotiation method as described above.

Each of these programs can use any programming language, and can be in the form of source code, object code, or intermediate code between source code and object code, such as in a partially compiled format, or in any other desirable format.

A further aim of the invention is an information medium or a computer-readable recording medium, and comprising instructions of a computer program as mentioned above.

The information or recording medium can be any entity or device capable of storing the programs. For example, the medium can comprise a storage means, such as a ROM, for example, a CD-ROM or a microelectronic circuit ROM, or even a magnetic recording means, for example, a hard disk, or a flash memory.

Moreover, the information or recording medium can be a transmissible medium such as an electrical or optical signal, which can be routed via an electrical or optical cable, by a radio link, by a wireless optical link, or by other means.

The program to according the invention particularly can be downloaded over an Internet type network.

Alternatively, the information or recording medium can be an integrated circuit, in which a program is incorporated, with the circuit being adapted to execute or to be used to execute the provision and acquisition methods according to the invention.

According to a fifth aspect, a further aim of the invention is a telecommunications system comprising at least one user equipment of a network according to the invention and at least one first and/or one second entity of the network according to the invention.

The negotiation method, the management method, the first and second entities and the telecommunications system benefit from the same previously mentioned advantages as the configuration method and the user equipment according to the invention.

It is also possible to contemplate, in other embodiments, that the configuration method, the negotiation method, the management method, the user equipment, the first and second entities and the telecommunications system according to the invention have all or some of the aforementioned features in combination.

BRIEF DESCRIPTION OF THE DRAWINGS

Further features and advantages of the present invention will become apparent from the following description, with reference to the accompanying drawings, which illustrate an embodiment devoid of any limiting character. In the figures:

FIG. 1, already described, shows the protocol stacks implemented on a user equipment and various entities of a network for supporting the ATSSS service defined by the 3GPP standard;

FIG. 2 shows a telecommunications system according to the invention in its environment, in a particular embodiment;

FIG. 3 shows the hardware architecture of a user equipment of the telecommunications system of FIG. 2 according to the invention, in a particular embodiment;

FIG. 4 shows the hardware architecture of an FF a transport (Forwarding Functioning) entity hosting function and/or a CF (Control Function) control entity for controlling such according to the an entity invention, in a particular embodiment;

FIG. 5A illustrates the establishment of tunnels between the user equipment UE1 and various FF entities in the prior art, whereas FIGS. 5B and 5C illustrate an embodiment of the invention;

FIGS. 6A and 6B respectively show the steps implemented by a user equipment, an entity hosting a transport function and one, respectively several, control entities in a first variant of the invention (variant 1);

FIG. 7 illustrates an example of the application of the first variant of the invention within the context of an ATSSS service defined by the 3GPP standard;

FIG. 8 shows the steps implemented by a user equipment and several FF entities hosting a transport function in a second variant of the invention (variant 2);

FIG. 9 illustrates an example of a result of the application of the second variant;

FIGS. 10A and 10B show, in the form of flowcharts, the various steps implemented by a user equipment and by an FF entity hosting a transport function in a third variant of the invention (variant 3).

DETAILED DESCRIPTION OF ILLUSTRATIVE EMBODIMENTS

FIG. 2 shows a telecommunications system 1 according to the invention in its environment, in a particular embodiment.

In the example contemplated in FIG. 2, the system 1 comprises at least one user equipment UE1, according to the invention, that has subscribed to a subscription with an operator OP of a telecommunications network NW in order to benefit from the services offered by this network. The user equipment UE1 in this case is, for example, a terminal such as a smartphone. As a variant, it can be another type of terminal (for example, a personal computer or PC), or an equipment of the CPE type, to which one or more terminals can be connected via a local network.

There are no assumptions concerning the nature of the network NW. It can be a 4G network, a 5G network, a proprietary network, etc. In the example contemplated herein, the network NW of the operator OP is a 5G network based on a core network CN.

Also, there are no limitations concerning the one or more access networks (or AN) that can be used to access the network of the operator OP, and more specifically the core network CN, nor concerning the number of these access networks, nor even concerning the technology used to connect to these access networks. In the example contemplated in FIG. 2, it is assumed that the user equipment UE1 can use two access networks AN1 and AN2 to connect to the core network CN (it may or may not be simultaneously connected to these two access networks): the network AN1 is a access 3GPP access network managed by the operator OP (in other words, a trusted network or TAN "Trusted Access Network"), whereas the access network AN2 is an access network managed by an administrative entity other than the operator OP (and for this reason is considered to be an "untrusted" network (or UAN "Untrusted Access Network")), such as, for example, a WLAN network. Of course, other configurations of access networks can be contemplated.

In a manner per se known and not described herein, mechanisms are set up for securing access to the services offered by the core network CN, but also for protecting the core network CN from attacks originating from outside the network CN. Of course, other security mechanisms are set up within the core network CN in order to protect it from attacks with sources that would be located inside the network. A further aim of these security mechanisms is to prevent the intermediate networks from accessing the sensitive data conveyed by the data streams exchanged between a user equipment (such as the user equipment UE1) and the core network CN or with a remote server via said core network CN.

The core network CN comprises several functional entities, also referred to as "functions", supporting the services provided by the network NW. Within the meaning of the invention, an entity or a function of the core network CN can equally refer to a physical device (for example, a server, a router) or a software function (for example, a virtual machine).

Thus, in the example contemplated in FIG. 2, the core network CN particularly comprises an AGW (Access Gateway) entity as defined by the 3GPP standard, used to control access to the core network CN from a UAN access network, and various entities or functions generally denoted FF (for "Forwarding Functions"), and involved in routing the data traffic via the core network CN. There are no assumptions concerning the termination of a connection by such an FF entity; the invention also applies to FF entities holding proxy functions that relay connections. Examples of an AGW entity and of an FF entity are respectively the N3IWF and ATSSS UPF functions mentioned above. Another example of an FF entity is a router. It should be noted that the AGW entity can integrate an FF entity involved in routing the data passing through the core network CN, in addition to its function of controlling access to the core network.

The FF entities are also used to connect the core network CN to third-party networks, such as, for example, to the Internet network.

Routing the traffic transmitted or intended for a user equipment connected to the core network CN, such as, for example, the user equipment UE1, can involve one or more FF entities of the core network CN. There are no assumptions concerning the location of the remote device with which the user equipment UE1 exchanges traffic: it can be an equipment, such as a server, located in the core network CN or connected to the core network CN (for example, the server S1 in FIG. 2) or in another network such as, for example, in the Internet network (for example, the servers S2, S3, . . . , Sn in FIG. 2, with "n" denoting an integer), or even another user equipment that may or may not be connected to the core network CN (not shown in FIG. 2). Furthermore, there are no assumptions concerning the software and physical (hardware) structure remote device. The remote device can be a of this dedicated equipment or a software instance.

In the example contemplated herein, for the sake of simplification, all the FF entities involved in routing traffic to or from the user equipment UE1 are considered to be managed by the same operator, namely the operator OP. However, in practice, tunnels can be set up for routing this traffic involving FF entities located in domains other than that of the operator OP (for example, for providing "roaming" services).

The network CN also comprises entities, called CF (Control Function) control entities, that are responsible for controlling one or more FF entities and/or one or more user equipments. Examples of such control entities within the context of a 3GPP 5G network, such as the core network CN, are the Access and Mobility Management Function (AMF), the Session Management Function (SMF), or the Policy Control Function (PCF). There are no assumptions herein concerning the structuring of the CF control entities (interconnection, hierarchy, functional capabilities, etc.). It also should be noted that the same physical element (or node) of the core network CN can host FF and CF entities.

In the embodiment described herein, all or some of the aforementioned FF and CF entities are distinguished from the corresponding entities defined by the 3GPP standard in that they are according to the invention and belong to the telecommunications system 1.

As mentioned above, the invention provides the user equipment UE1 with the possibility of deactivating all or some of the procedures for encrypting and/or for establishing tunnels that are implemented with entities of the network involved in routing traffic intended for or transmitted by the user equipment UE1. For the sake of simplification, the remainder of the description is limited to the deactivation of encryption procedures and three variants of the invention are contemplated, in which:

Variants 1 and 2: a prior negotiation occurs with the network before the deactivation of one or more encryption procedures by the user equipment UE1 with one or more FF entities; in variant 1, the negotiation occurs with the CF control entities managing this or these FF entities, whereas in variant 2, the negotiation occurs directly with the one or more FF entities; or Variant 3: the deactivation is implemented by default by the user equipment UE1 without prior negotiation with the network.

It should be noted that similar or identical variants can be contemplated for deactivating one or more procedures for establishing a tunnel in addition to or as a replacement for the encryption procedures. The deactivation of encryption procedures and of tunnel establishment procedures are not mutually exclusive and can be jointly decided upon by the user equipment UE1, or on the contrary independently.

In each of the variants 1 to 3 described herein, the user equipment UE1 has the hardware architecture of a computer as shown in FIG. 3. It particularly comprises a processor 2, a random-access memory 3, a read-only memory 4, a non-volatile memory 5, and communication means 6 particularly comprising various physical and protocol interfaces allowing the user equipment UE1 to connect to the access networks allowing it to access the core network CN, namely, in this case, access networks AN1 and AN2. Such interfaces are per se known and are not described in detail.

The read-only memory 4 constitutes a recording medium according to the invention, which can be read by the processor 2 and on which a computer program according to the invention is recorded, namely a computer program PROG-UE (1) for variant 1, PROG-UE (2) for variant 2, and PROG-UE (3) for variant 3.

The programs PROG-UE (1), PROG-UE (2) and PROG-UE (3) define functional modules of the user equipment UE1 that are based on or control the aforementioned hardware elements 2 to 6. In particular, these modules comprise, in the three variants contemplated herein, as shown in FIG. 2:

a communication module 7A configured to establish at least one connection with the remote device (for example, with the server S1) supporting an encrypted communication, with this connection passing via various FF entities of the core network CN involved in routing traffic exchanged between the user equipment UE1 and this remote device. It should be noted that there are no assumptions concerning the termination of a connection by an FF entity involved in routing traffic. According to the contemplated transport protocol, the encrypted communication between the user equipment UE1 and the remote device can require the establishment of a plurality of connections between the user equipment UE1, respectively the remote device, and each of the FF entities involved in routing traffic (for example, for the QUIC protocol). This encrypted communication can also, as a variant, rely on associations between the user equipment UE1 and each of the FF entities (for example, for the IPsec protocol);

a selection module 7B configured to select one or more encryption procedures implemented with these FF entities and d that can be deactivated during the encrypted communication. It should be noted that a prerequisite in order to be able to deactivate an encryption procedure applied to the data exchanged during the communication is the existence of another encryption procedure protecting these data (at least the payload data). Furthermore, according to the contemplated variant, the selection module 7B can select the one or more encryption procedures to be deactivated as a function of information originating from the network, as described in further detail hereafter; and a deactivation module 7C configured to deactivate the one or more encryption procedures selected by the selection module 7B.

The programs PROG-UE (1) and PROG-UE (2) also define another functional module of the user equipment UE1 activated when implementing variants 1 and 2, namely a module 7D for negotiating with the network (shown as dashed lines in FIG. 2) configured to request prior authorization from the network in order to deactivate one or more encryption procedures. This negotiation module 7D is configured in variant 1 to negotiate with a CF control entity of the core network CN, whereas in variant 2, it is configured to directly negotiate with the one or more FF entities involved in routing data exchanged between the user equipment UE1 and its correspondent.

Program PROG-UE (3) defines the modules 7A-7C such that the one or more encryption procedures selected by the selection module 7B is/are deactivated by default by the deactivation module 7C when establishing the connection with the remote device passing via the one or more relevant FF entities. For each FF entity, the module 7A is then configured for:
- requesting the establishment of a first connection with or via this FF entity in which the one or more selected encryption procedures is/are deactivated (with respect to that which has been stated above, the first connection is either the connection established with the remote device for supporting the encrypted communication, or a connection established with the FF entity required in order for the data exchanged between the user equipment UE1 and the remote device to be routed via this FF entity);
- in the event of the rejection of the first connection by the FF entity, requesting the establishment of a second connection with or via the FF entity (see the above comment), in which the one or more selected encryption procedures is/are (re-) activated between the user equipment UE1 and the FF entity.

The operation of modules 7A to 7D is explained in further detail hereafter for each of the contemplated variants.

Furthermore, in each of the variants contemplated herein, the FF and CF entities of the telecommunications system 1 also have the hardware architecture of a computer as shown in FIG. 4. When two FF and CF entities are collocated, they can obviously share this architecture.

Each CF or FF entity particularly comprises a processor 8, a random-access memory 9, a read-only memory 10, a non-volatile memory 11, and communication means 12 allowing them to particularly communicate with other entities of the core network CN or other networks.

The read-only memory 10 constitutes a recording medium according to the invention, which can be read by the processor 8 and on which, for the FF entities, a computer program PROG-FF (1) is recorded for variant 1, a computer program PROG-FF (2) is recorded for variant 2, and a computer program PROG-FF (3) is recorded for variant 3, and, for the CF entities, a computer program PROF-CF (1) is recorded for variant 1. It should be noted that for variants 2 and 3 described herein, the CF functions of the network NW comply with the 3GPP standard.

The programs PROG-FF (1), PROG-FF (2) and PROG-FF (3) define functional modules of an FF entity according to the invention that are based on or control the aforementioned hardware elements 8 to 12. These functional modules of the FF entity comprise, as illustrated in FIG. 2:
- a communication module 13A, configured to communicate with the user equipment UE1 during an encrypted communication of this user equipment UE1 with a remote device (for example, the server S1). The communication between the module 13A and the user equipment UE1 can rely on the establishment of one or more connections (corresponding to multiple paths) between the module 13A and the user equipment UE1, on an association, etc., depending on the application context of the invention;
- a deactivation module 13B, which on the initiative of the user equipment UE1 is configured to deactivate one or more encryption procedures implemented by the module 13A for communicating with the user equipment UE1 during the encrypted communication passing through the FF entity; and
- a processing module 13C, configured to process data exchanged during this encrypted communication between the two equipments via the FF entity, whether or not these data are the subject of an encryption procedure between the user equipment UE1 and the FF entity. The processing module 13C is particularly configured, when an encryption procedure is deactivated according to the invention, to be able to process the data passing through the FF entity (in other words, to no longer apply the decryption procedure corresponding to the deactivated encryption procedure, and to no longer encrypt the data packets that it receives from the remote device and sends to the user equipment UE1).

According to the contemplated variant, additional modules or a different configuration of the modules 13A-13C can be defined by the PROG-FF (1), PROG-FF (2) and PROG-FF (3) programs.

Thus, according to variant 1 (prior negotiation between the user equipment UE1 and the CF control entity managing the considered FF entity), program PROG-FF (1) further defines a second communication module 13D (shown by dashed lines in FIG. 2) configured to interact with the CF control entity of the FF entity with a view to creating a connection context used by the modules 13A-13C during the encrypted communication of the user equipment UE1, in which, on the initiative of the latter, an encryption procedure is deactivated with the FF entity, and to process the data passing through the FF entity. The second communication module 13D is also configured to transmit, to the CF entity, at least one item of information, called deactivation context information, denoted herein as "Optimized-INFO", intended for the user equipment UE1 and providing said user equipment with at least one indication concerning at least one encryption procedure that can be deactivated with the FF entity. This deactivation context information is then used by the module 7B for selecting the user equipment UE1 to select an encryption procedure to be deactivated.

According to variant 2 (prior negotiation between the user equipment UE1 and the considered FF entity), program PROG-FF (2) defines negotiation module 13E lines in FIG. 2) configured to (shown as dashed directly interact with the user equipment UE1 (and in particular with its negotiation module 7D): the negotiation module 13E is configured to receive and to process an authorization request to authorize the deactivation, by the user equipment UE1, of at least one encryption procedure implemented with the FF entity, and, if the authorization request is accepted, to send the user equipment UE1 at least one item of "Optimized-INFO" deactivation context information, as mentioned above in variant 1. The negotiation module 13E is also configured herein to create, if the request from the user equipment UE1 is accepted, a connection context intended to allow the communication module 13A to manage the encrypted communication of the user equipment UE1 in which an encryption procedure with the FF entity, selected by the user equipment UE1 in accordance with the "Optimized-INFO" information, is deactivated by the deactivation module 13B, and to allow the module 13C to process the corresponding data. It should be noted that in variant 2, the FF entity has the means of a second entity within the meaning of the invention.

Finally, according to variant 3, the module 13A is configured to process a request, received from the user equipment UE1, to establish a first connection with or via the FF entity, in which at least one encryption procedure between the user equipment UE1 and the FF the equipment UE1, is entity, selected by user the encrypted communication between deactivated during device (for the user equipment UE1 and the remote example, the server S1).

If the request to establish the first connection is accepted by the FF entity (by its module 13A in this case), then the deactivation module 13B is configured to deactivate said encryption procedure, and the module 13C is activated in order to process the data exchanged between the user equipment UE1 and the remote device, passing through the FF entity via the first connection.

Otherwise, the module 13C is activated to process the data exchanged between the user equipment UE1 and the remote device, passing through the FF entity, via a second connection established between the user equipment UE1 and the remote device, in which said encryption procedure with the FF entity is maintained and implemented.

In variant 1, program PROG-CF (1) defines functional modules of a CF entity according to the invention (second entity within the meaning of the invention) managing an FF entity as mentioned above for variant 1, with these functional modules being based on or controlling the aforementioned hardware elements 8 to 12. The functional modules of the CF entity in this case particularly comprise, as illustrated in FIG. 2:

- a negotiation module 14A, configured for:
  - receiving a request by the user equipment UE1 for authorizing the deactivation, for at least one encrypted communication of the user equipment UE1 with a remote device (for example, S1) via the core network CN, of at least one encryption procedure implemented with an FF entity involved in routing data exchanged between the user equipment UE1 and the remote device during the encrypted communication; and
  - sending, if the request is accepted, at least one item of "Optimized-INFO" deactivation context information, as mentioned above, intended for the user equipment UE1; and
- a configuration module 14B, activated if the FF entity in question is controlled by the CF entity, and programmed to configure this FF entity so that it is able to communicate with the user equipment UE while the one or more encryption procedures selected by the user equipment is/are deactivated, and thus process the data exchanged between the user equipment UE1 and the remote device passing through it. In variant 1 described herein, the configuration module 14B interacts with the second communication module 13D of the FF entity in order to create a connection context used by the modules 13A-13C, as indicated above. The configuration module 14B receives, from the second communication module 13D of the FF entity and during this interaction, the aforementioned "Optimized-INFO" deactivation context information intended for the user equipment UE1. In variant 1 contemplated herein, program PROG-CF (1) further defines a communication module 14C of the CF entity with at least one other CF control entity, which is activated if the authorization request received from the user equipment UE1 relates to FF entities that are not directly managed by the CF entity. Indeed, in this case, the communication module 14C relays the authorization request from the user equipment UE1 to the one or more relevant CF control entities and relays the responses received from this or these CF control entities to the user equipment UE1.

The operation of modules 13A-13E of the FF entities and of modules 14A-14C of the CF entities is explained in further detail hereafter for each of the contemplated variants.

The main steps of the configuration, negotiation and management methods implemented by the user equipment UE1, the CF entities and/or the FF entities according to the invention in the previously introduced variants 1 to 3 will now be described with reference to FIGS. 5 to 10.

In this case, in order to describe these three variants, the context of an encrypted communication is used, via the network NW and more specifically the core network CN, between the user equipment UE1 and a remote device, for example, the server S1. There are no limitations to the encryption mechanisms implemented during this encrypted communication. In a manner per se known, a plurality of encryption procedures is generally implemented on a network, whether this is on the access network, the core network, and/or between the communicating equipments. These encryption mechanisms also can be activated on the various layers of the OSI model (physical layer, link layer, network layer, transport layer, application layer, etc.).

In the example contemplated herein, the context of an encrypted communication using the QUIC protocol between the user equipment UE1 and the server S1 is used. In a known manner and as previously stated, the QUIC protocol not only encrypts the application data (also referred to as "payload data") exchanged between the user equipment UE1 and the server S1, but also the connection control information, except for a limited number of them, such as, for example, the connection identifier. In addition to the QUIC encryption, the application data exchanged between the user equipment UE1 and the server S1 may or may not be encrypted by another encryption procedure (for example, applied on the physical layer).

It is assumed that, during this encrypted communication in accordance with the QUIC protocol, the data exchanged between the user equipment UE1 and the server S1 passes through a plurality of FF entities of the telecommunications system 1, involved in routing this data in the core network CN. In the example contemplated herein, at least one connection is established between the user equipment UE1 and each FF entity by which the data exchanged between the user equipment UE1 and the server S1 is conveyed (the invention applies to a simple connection such as a connection using multiple paths), and the QUIC protocol is used to carry out the encapsulation and the encryption of the data passing through each connection, as recommended in the solutions proposed by the 3GPP standard, as mentioned above, to provide any type of traffic with an ATSSS service (transported by any type of transport protocols, which may or may not be TCP).

The application of this encapsulation mode to each FF entity passed through by the data packets is illustrated in FIG. 5A for three entities FF1, FF2 and FF3. It results in the establishment of at least three tunnels (that is, three encapsulation schemes) and the implementation of at least four encryption procedures by the user equipment UE1 linked to the use of the QUIC protocol between the user equipment UE1 and the server S1, on the one hand, and between the user equipment UE1 and each of the entities FF1, FF2 and FF3, on the other hand. It should be noted that, between the user equipment UE1 and the first traversed entity FF1, the three tunnels, respectively the four encryptions, are nested together leading to an even greater overhead. According to the 3GPP standard, an IPsec/ESP (Encapsulating Security Payload) (not shown in FIG. 5A) tunnel (and therefore an additional encapsulation) can be added to these four tunnels between the user equipment UE1 and the AGW entity if the access network used by the user equipment UE1 to access the core network CN is a non-3GPP network, which is considered to be untrusted (UAN network). It should be noted that the above description for the user equipment UE1 is also applicable for the server S1.

The previous assumptions are not limiting per se and the invention is applicable in other contexts. Thus, a protocol other than QUIC can be used between the user equipment UE1 and the server S1, such as, for example, TCP, UDP, etc., and/or to establish secure tunnels between the user equipment UE1 and each of the FF entities of the network through which the data exchanged between the user equipment UE1 and the server S1 passes, such as, for example, the ILS, DTLS, IPsec, etc., protocols. Furthermore, the communications between the user equipment UE1 and each FF entity involved in routing data can be based on an association rather than on a dedicated connection (for example, when the IPsec protocol is used), etc.

Each of the variants will now be described within this context.

Variant 1;

Variant 1 is illustrated in FIGS. 6 and 7. By way of a reminder, according to this variant 1 the user equipment UE1 previously negotiates with the core network CN, and more specifically with the CF control entities, for the deactivation of one or more encryption procedures user equipment UE1 with the FF implemented by the entities managed by these control entities, and involved in routing data exchanged between the user equipment UE1 and the server S1. For the sake of simplification, it is assumed throughout the remainder of the description that the entities FF1, FF2 and FF3 involved in routing data exchanged between the user equipment UE1 and the server S1 during the encrypted communication thereof are managed by the same control entity CF1. However, the procedure described hereafter also can be applied within a context whereby each FF entity is managed by a different control entity: it is then implemented by the user equipment UE1 with each control entity, or with a dedicated control entity that acts as a relay between the user equipment UE1 and the control entities managing the FF entities, as illustrated in FIG. 6B (see relay steps E10b and E40b).

The negotiation can be initiated by the user equipment UE1 via its negotiation module 7D at any time, for example, when attaching the user equipment UE to the core network CN, when activating a network session, at regular intervals, when explicitly activating the user equipment UE1 by the user, when activating by an application (for example, by the ATSSS application on board the user equipment UE1) via a dedicated API, etc.

More specifically, with reference to FIG. 6A, the user equipment UE1 requests the authorization of the network by sending the control entity CF1 an authorization request for deactivating at least one encryption procedure with at least one FF entity involved in routing data during the encrypted communication established by the user equipment UE1 with the server S1 (entities FF1, FF2 and FF3 in the contemplated example) (step E10). This authorization request in this case assumes the form a of request called "Optimized-Configuration-Request" intended for the entity CF1. The "Optimized-Configuration-Request" authorization request can explicitly specify the entities FF1, FF2 and FF3 targeted by the user equipment UE1 or, as a variant, it can be a more general authorization request intended to know the FF entities of the network involved in routing data that may or may not be affected by such a deactivation. It should be noted that the user equipment UE1 has been previously configured with information enabling it to identify which control entity to be requested in order to acquire such an authorization, in a manner per se known and not described herein. However, the request can pass through other entities (for example, through an AGW entity) before reaching the recipient entity CF1.

Upon receipt of the request by the entity CF1, if the core network CN does not support the invention, in other words, does not offer of the possibility deactivating an encryption procedure under the conditions proposed by the invention, then the "Optimized-Configuration-Request" request is ignored by the entity CF1 or an error message (for example, a "Fail" message) is returned to the user equipment UE1. The user equipment UE1 is then configured in this case so as not to return such a request before a determined period has elapsed, typically 24 hours, in order to allow it to detect a change in the configuration of the core network CN.

If, on the contrary, the core network CN supports the invention (as assumed in FIGS. 6A and 6B), the "Optimized-Configuration-Request" request is then processed in this case by the entity CF1, and in particular by its negotiation module 14A and its configuration module 14B. As a variant, it can be relayed by the communication module 14C of the entity CF1 to another CF entity for processing, for example, to the entity CF2, as illustrated in FIG. 6B.

More specifically, in the variant 1 described herein, the entity CF1 (respectively CF2 in the example checks whether the user illustrated in FIG. 6B) equipment UE1 is authorized (i.e., approved) to send such a request, for example, by implementing a procedure for identifying/authenticating the user equipment UE1, which procedure is per se known and is not described herein (step E20).

If the entity CF1 (respectively CF2) determines that the user equipment UE1 is authorized to request such a procedure (as is assumed herein), the entity CF1 (respectively CF2) then interacts, via its configuration module 14B, with the FF entities likely to be involved in routing the data exchanged between the user equipment UE1 and the server S1, namely in this case with the entities FF1, FF2 and FF3 (step E30). For the sake of simplification in FIGS. 6A and 6B, only the interaction with the entity FF1 is shown.

This interaction in this case involves the entity CF1 sending a control message, called, for example, "FF-Control", to the entity FF1 (and more specifically to its communication module 13D) intended to configure the latter so that it is able to establish a connection with the user equipment UE1 in which one or more encryption procedures selected by the latter is/are deactivated, and to process the data exchanged between the user equipment UE1 and the remote device passing through this connection. This control message notifies the entity FF1 that it has to set up such a deactivation for the user equipment UE1, upon a request from the latter, and thus assist in the optimization of the switching performance capabilities of the user equipment UE1.

In the variant described herein, the "FF-Control" message triggers, on the entity FF1, the creation of a context CNT (Id (UE1), DESACT) associated with an identifier Id (UE1) of this user equipment UE1 (for example, with n IP address allocated to this user equipment UE1 by the network), in anticipation of such a connection with the user equipment UE1 (that is directly established with the entity FF1 within the context of the use of the QUIC protocol contemplated by way of an illustration herein or established with the remote server S1 via the entity FF1, if an association between the entity FF1 and the user equipment UE1 is sufficient for the entity FF1 to process the data of the user equipment UE1 (for example, presentation of a NONCE security key). The "DESACT" field explicitly indicates that, during this connection, if decided upon by the user equipment UE1, at least one encryption procedure with the entity FF1, selected by the user equipment UE1, will be deactivated. The context CNT (Id (UE1), DESACT) is intended to be used by the modules 13A-13C of the entity FF1 for processing the data passing through the entity FF1 during this connection. It is stored in a memory of the entity FF1 (for example, in its non-volatile memory 11).

Following the creation of this context, the entity FF1 determines the conditions (i.e., in which context) by which it is able to set up such a deactivation with the user equipment UE1 (for example, for which access network(s) or which application(s), which encryption procedure(s), with or without the presentation of a security token, etc.). The entity FF1 then acknowledges, via its communication module 13D, the "FF-Control" message by sending an acknowledgement message ACK to the entity CF1 (respectively CF2) (step E40). In this case, the acknowledgement message ACK includes at least one item of "Optimized INFO" deactivation context information, as mentioned above, reflecting the conditions thus determined by the entity FF1. This "Optimized INFO" information thus particularly comprises least one indication concerning at least one encryption procedure that can be deactivated by said user equipment on the entity FF1. Such an indication is, for example, an application supported by the user equipment UE1 (for example, the ATSSS application), a type of connection (for example, a QUIC connection), an access network used by the user equipment eligible for deactivating an encryption procedure with the entity FF1, or at least one specific encryption procedure used with the entity FF1 that can be deactivated (for example, the QUIC encryption procedure associated with the tunnel set up between the user equipment UE1 and the function FF1) or, on the contrary, that cannot be deactivated by the user equipment UE1. The deactivation context information transmitted in the acknowledgement message can also include a security key, called NONCE herein, intended to be presented by the user equipment UE1 to the entity FF1 when the user equipment UE1 will establish a connection with the latter (or via the latter, if the transport protocol considered for routing the data does not require the establishment of a connection between the user equipment UE1 and the entity FF1), during which connection at least one encryption procedure with the entity FF1 is deactivated. This NONCE security key is intended to allow the entity FF1 to carry out security checks when user equipment attempts to establish a connection therewith (or via the entity FF1 within the above context) for which one or more encryption procedures that are normally implemented are deactivated by the user equipment in question.

As mentioned above, the entity CF1 (respectively CF2) proceeds with the entities FF2 and FF3 as it has just been described for the entity FF1 (at the same time or successively). If control entities separate from the entity CF1 (for example, the entity CF2) are involved in these exchanges, they will relay the acknowledgement messages received from entities FF1 to FF3 to the entity CF1.

Then, the entity CF1 positively responds to the authorization request from the user equipment VEI by means of a response message, called "Optimized-Configuration-Accept" message herein, that is sent to the user equipment UE1 via its negotiation module 14A (step E50). The "Optimized-Configuration-Accept" response message includes the "Optimized INFO" deactivation context information provided by each of the requested FF entities (FF1, FF2 and FF3 in the example contemplated herein). For the sake of simplification herein, the information provided by each of the requested FF entities is aggregated and supplied as is to the user equipment UE1 in the "Optimized-Configuration-Accept" message. As a variant, the information can be processed by the entity CF1 before being sent to the user equipment UE1, for example, can be summarized in the form of rules, etc.

Upon receipt of the authorization of the entity CF1 by its negotiation module 7D, the user equipment UE1 extracts the "Optimized INFO" deactivation context information from the "Optimized-Configuration-Accept"-message and stores it, for example, in its non-volatile memory (step E60).

This "Optimized INFO" deactivation context information is then used by the selection module 7B of the user equipment UE1 to identify the communications (in other words, the connections in the example of the QUIC protocol contemplated herein) eligible for deactivating one or more encryption procedures applied to the data exchanged during its encrypted communication with the server S1 via an FF entity. The selection of these communications can rely on the selection of the interfaces eligible for deactivating one or more encryption procedures. Then, the selection module 7B selects one or more encryption procedures from among the encryption procedures implemented in the communications identified as eligible as a function of at least one determined selection criterion (step E70).

As mentioned above, during this selection, the user equipment UE1 particularly ensures that, on the one or more communications affected by a deactivation of an encryption procedure, the transmitted data remains protected by at least one other encryption procedure despite this deactivation. This other encryption procedure is, for example:

an encryption procedure implemented with another entity of the network involved in routing said data (for example, the user equipment UE1 can decide to deactivate the encryption procedure implemented with the entity FF1 as long as the data packets exchanged with the server S1 are protected by another encryption procedure implemented with the entity FF2 and/or the entity FF3); and/or an encryption procedure implemented on a network for accessing the core network CN used by the user equipment UE1 to exchange data packets with the server S1 (for example, an encryption procedure implemented when establishing an IPsec tunnel between the user equipment UE1 and an N3IWF function when the access network is considered to be UAN); and/or an encryption procedure implemented with the server S1 to exchange data packets (for example, the encryption procedure of the QUIC protocol when this protocol is used between the user equipment UE1 and the server S1).

These examples are provided solely by way of an illustration and other encryption mechanisms/procedures can be contemplated as a variant.

Other selection criteria can be contemplated, in addition to the aforementioned criterion, such as, for example, the CPU (Central Processing Unit) capacity of the user equipment UE1, the maximum packet size (or MTU for Maximum Transmission Unit) that can be transmitted when communicating with the entity FF1, or the latency of the application requesting the connection with the entity FF1, etc. These criteria can be specific to the user equipment UE1, to the connection with the core network, etc.

Then, the user equipment UE1 deactivates, by means of its deactivation module 7C, the one or more encryption procedures selected by its selection module 7B (step E80). In other words, when, for routing data exchanged during its encrypted communication with the server S1, it establishes QUIC connections via its communication module 7A with the one or more FF entities of the core network CN associated with the one or more deactivated encryption procedures or a connection with the server S1 passing through this entity or FF, these entities these connections are set up without implementing this or these encryption procedures with the one or more FF entities in question.

FIGS. 5B and 5C illustrate examples, to be compared with the situation of the prior art illustrated in FIG. 5A, in which, respectively:

- all the encryption procedures between the user equipment UE1 and the FF entities involved in routing the data between the user equipment UE1 and the server S1 (namely, the entities FF1; FF2 and FF3) have been deactivated by the latter when the access network used by the user equipment UE1 is the 3GPP access network AN1, which is considered by the core network CN to be a TAN network (see FIG. 5B);
- all the encryption procedures between the user equipment UE1 and the FF entities involved in routing the data between the user equipment UE1 and the server S1 have been deactivated by the latter except for the encryption procedure applied with the first entity FF1, when the access network used by the user equipment UE1 is the access network AN2, which is considered to be a UAN network (see FIG. 5C).

It should be noted that, in the case of a multipath connection using the two physical interfaces available to the user equipment UE1 in order to be able to access the core network via the two access networks the user equipment UE1 can process the AN1 and AN2, established on each of the paths, as is connections respectively illustrated in FIGS. 5B and 5C.

The advantages provided by the invention are therefore clearly apparent with reference to FIGS. 5A, 5B and 5C, in terms of optimizing the complexity of the processing operations implemented when establishing the connections with or via the various FF entities.

It should be noted that, in the example contemplated herein, only the encryption procedures are subject to deactivation, if applicable, with the tunnels that are set up between the user equipment UE1 and each of the FF entities being maintained. However, this assumption does not limit the invention per se. Indeed, the invention can also apply similarly to the deactivation of tunnels between the user equipment UE1 and the various FF entities, with the prerequisite for deactivating a procedure for establishing a tunnel with an FF entity being the assurance of routing the data via this FF entity, by means of, for example, routing options at the source, or by using another tunnel. Of course, other criteria can be contemplated to describe the deactivation of a tunnel, such as, for example, the overhead generated by the encapsulation required to establish this tunnel, the latency induced by the establishment of this tunnel, etc. Furthermore, it should be noted that, as mentioned above, the deactivation of a tunnel between the user equipment UE1 and a given FF entity can be concomitant with or, on the contrary, independent of the deactivation of a corresponding encryption procedure (for example, when the tunnel in question is a secure tunnel).

FIG. 7 illustrates an embodiment of variant 1 of the invention for the ATSSS service defined by the 3GPP standard, in combination with the use of the QUIC protocol to establish a secure tunnel between the user equipment UE1 and the FF entities involved in routing the data exchanged between the user equipment UE1 and the server S1.

In this example, with reference to the previously introduced notations, and two entities FF1 FF2, respectively made up of a UPF entity and an NW3IF entity, and two entities CF1 and CF2, respectively made up of an AMF entity and an SMF entity, are considered. The UPF, N3IWF, AMF and SMF entities have the features defined in the 3GPP: standard (for example, in document TS 23.501 introduced above). They are also configured herein to implement the invention according to variant 1, as well as the messages that are conventionally exchanged between these entities.

More specifically, in the example of FIG. 7, steps E10 to E80 of variant 1 are implemented as described above by considering the following elements:

- the "Optimized-Configuration-Request" authorization request sent in step E10 is transmitted to the entity CF1 by means of the "PDU Session Establishment Request" message for establishing a session, which is known from the 3GPP standard, allowing the user equipment UE1 to recover the configuration of the tunnels (QUIC in this case) to be set up between the user equipment UE1 and the ATSSS function supported by the entity FF1=UPF. This message particularly comprises an identifier "PDU Session ID" for the session and a parameter "MA PDU" indicating that the session uses multiple paths (established by the user equipment UE1, for example, via the access networks AN1 and AN2). It should be noted that the message implicitly identifies the entity FF1=UPF hosting the ATSSS function, targeted by the authorization request of the user equipment UE1, by means of the presence of the parameter "MA PDU". In this case, the "PDU Session Establishment Request" is also modified so as to integrate a new field, referred to as "Optimized-QUIC", reflecting the authorization request requested by the user equipment UE1;
- the authorization request is received by the control entity CF1=AMF, which, after having checked, during step E20, core network the that the CN implements invention and that the user equipment UE1 is authorized to deactivate an encryption procedure as proposed by the authorization to invention, relays the request the control entity CF2=SMF responsible for managing the entity FF1=UPF and able to process this request;
- the control entity CF2=SMF then interacts with the entity FF1=UPF during step E30 as described above: the "FF-Control" configuration message sent by the entity CF2 to the entity FF1 in this case assumes the form of an "N4 Session Establishment" defined message the by 3GPP standard, in which message a new "Optimized-connection" field is inserted, as described above in order to share the request of the user equipment UE1 with the entity FF1;
- the acknowledgement sent by the entity FF1=UPF to the entity CF2=SMF with the "Optimized INFO" deactivation context information is an "N4 Session Ack" message, comprising a new field containing the "Optimized INFO" information;

the entity CF2 similarly acquires (like similar messages) the "Optimized INFO" deactivation context information of the entity FF2=NW3IF;

the entity CF2=SMF relays the "Optimized INFO" information provided by the entities FF1 and FF2 to the entity CF1 AMF in a message called "Namf_Comm_NIN2MessageTransfer", as defined by the 3GPP standard, that is modified so as to contain the "Optimized INFO" information. In the example contemplated in FIG. 7, the "Optimized INFO" information is also partly integrated in "ATSSS rules" (only partly in this case in order to advantageously maintain the format of the ATSSS rules defined by the 3GPP standard), Examples of these rules are provided below:

ATSSS Rule 1: interface=3GPP; application=id; FF=ATSSS UPF; NULL_Encryption_Status= Enable; . . . .

ATSSS Rule 2: interface=non-3GPP; application=id; FF =ATSSS UPF; NULL_Encryption_Status= Enable; . . . .

ATSSS Rule 3: interface=non-3GPP; application=id; FF=ATSSS N3IWF; NULL_Encryption_Status=Disable; . . . .

In these examples, the ATSSS rules each comprise an "interface" parameter identifying the relevant access network interface of the user equipment UE1, set to 3GPP or non-3GPP in this case (it is nevertheless possible to contemplate a more accurate qualification indicating the relevant type of access network), an "application" parameter containing an identifier or a label of the application of the user equipment UE1 to which the rule applies, an "FF" parameter identifying the FF entity to which the rule applies, and a "NULL_Encryption_Status" parameter, set to Enable or Disable in this case, to indicate whether or not the one or more encryption procedures related to the other parameters of the rule can be deactivated with the FF entity to which the rule applies. It should be noted that all the parameters thus entered in each ATSSS rule allow the user equipment UE1 to determine which encryption procedure(s) it is authorized to deactivate. By way of an illustration, a rule indicating the identifier of a "3GPP" access network interface and an identifier of an FF function (for example, a UPF function on a PGW (Packet data network GateWay)) gateway, with which the user equipment UE1 normally uses an encryption procedure on the physical layer of the OSI model, allows the user equipment UE1 to identify that it can deactivate this encryption procedure with the PGW/UPF entity implemented on the physical layer. According to another example, another rule can indicate the possible deactivation of an encryption procedure with an ATSSS UPF function, which the user equipment UE1 will interpret as the possibility of deactivating the QUIC encryption procedure implemented when establishing a tunnel with this ATSSS UPF function. Furthermore, other parameters that are required for establishing QUIC tunnels with the FF entities involved in routing the data between the user equipment UE1 and the remote server S1 can be added to these rules, such as, for example, a NONCE security parameter, etc., or else provided in the "Optimized INFO" field, as proposed herein;

the ATSSS rules and the "Optimized INFO" information integrating the deactivation context information in this case are relayed in step E50 by the entity CF1=AMF to the user equipment UE1 in a "PDU Session Establishment Accept" message, authorizing the user equipment UE1 to benefit from the invention, and notifying it of the connections eligible for the deactivation of the encryption (in this a case characterized by "NULL_Encryption_Status" parameter set to Enable). In the example contemplated in FIG. 7, as soon as an access interface is associated with a "NULL_Encryption_Status" parameter set to Enable for the ATSSS UPF entity, the user equipment UE1 deactivates the QUIC encryption established with procedure on each of the connections this entity (in this case it maintains the establishment of the QUIC tunnels with this entity). However, it should be noted that, as mentioned above, the user equipment UE1 can consider other criteria for selecting the connections on which the QUIC encryption procedures (or other encryption procedures as a function of the rules and the deactivation context information it is provided with) are deactivated, while complying the constraints with stipulated by the ATSSS rules. Thus, in the example of FIG. 7, no additional encryption is set up between the user equipment UE1 and the ATSSS UPF entity when activating the ATSSS service. This optimization is applied for the incoming and outgoing traffic relating to the user equipment UE1.

Variant 2:

Variant 2 is illustrated in FIGS. 8 and 9. By way of a reminder, according to this variant 2 the user equipment UE1 previously and directly negotiates, with each of the FF entities involved in routing the data exchanged with the remote server S1, for the deactivation of one or more encryption procedures implemented by the user equipment UE1 with these FF entities. This variant 2, like variant 1, also can be contemplated for deactivating tunnels with the FF entities.

For the sake of simplification, the elements of variant 2 that are identical or similar to the corresponding elements of variant 1 (for example, the deactivation context information, the criteria applied by the user equipment UE1 to select the encryption procedures to be deactivated, the created connection contexts CNT, etc.) are not described in detail hereafter.

With reference to FIG. 8, it is assumed throughout the remainder of the description that the entities FF1, FF2, . . . , FFm, with "m" denoting an integer greater than or equal to 1, are explicitly configured (declared) in the user equipment UE1, using, for example, mechanisms that are known to a person skilled in the art as DHCP (Dynamic Host Configuration Protocol) or PCO (Protocol Configuration Option). For example, the user equipment UE1 can be configured with one or more FF entities to be used to access a given service: in the example of the ATSSS service, it can be particularly configured with the identities (or identifiers) of the FF entities N3IWF, UPF, etc.

Based on this configuration, the user equipment UE1, and in particular its selection module 7B, determines that redundant encryptions will be set up for processing the same data, when it will establish a communication with a remote device and identify the FF entities with which these redundant encryptions will be set up (step F10). For example, the user equipment UE1 determines that the entities N3IWF and ATSSS UPF will be requested for processing the same application data when communicating with a remote device such as the server S1, and that these application data are already encrypted, in particular by means of the QUIC or TLS protocol. Criteria similar to those indicated in variant 1 can be considered by the selection module 7B.

The user equipment UE1 then activates its negotiation module 7D in order to trigger a negotiation procedure with each of the FF entities thus identified, with a view to deactivating the encryption procedures implemented with the latter. In variant 2 as contemplated herein, this negotiation is triggered upstream of the to prepare in advance the communication, in order connection contexts that will be used for routing the data packets via the FF entities.

More specifically, the user equipment UE1 sends, to all or some of the identified FF entities, an "Optimized-Configuration-Request" request requesting the authorization of each of these FF entities in order to be able to deactivate the encryption procedures that are normally provided with these entities during its future encrypted communications (typically in this case the encryption procedures related to the QUIC connections that it will establish with each of these entities) (steps F20, F50, F80 for the entities FF1, FF2 and FFm, respectively). For the sake of simplification, only the exchanges with the entities FF1, FF2 and FFm are shown in FIG. 8. It should be noted that this request can target a particular communication, or a set of determined communications (for example, the communications that will be established by the user equipment UE1 for a determined duration). It can assume, by way of an illustration within the context of the Quic protocol, the form of a new QUIC frame called, for example, TUNNEL-NULL-ENCRYPTION, comprising a "Status" parameter set to "Enable".

In the example illustrated in FIG. 8, the entities FF1, FF2, . . . , FFm are successively contacted. The user equipment UE1 can actually choose to contact the FF entities without any particular order, at the same time or sequentially. As a variant, it is possible to contemplate it contacting them in a specific order, for example, in an order of preference determined by the selection module 7B when determining the encryption procedures that can be deactivated.

Upon receipt of the "Optimized-Configuration-Request" request by an FF entity (for example, FF1, FF2, . . . . FFm in the example of FIG. 8), and more specifically by its negotiation module 13E, the latter determines whether the FF entity supports the optimization procedure required by the user equipment UE1 aimed at deactivating the one or more encryption procedures of the data transmitted to or intended for the user equipment UE1 and passing through this FF entity, normally provided by the 3GPP standard (for example, the QUIC encryption procedures) (steps F30, F60 and F90 for the entities FF1, FF2 and FFm, respectively).

If the requested FF entity supports the optimization procedure, in other words the deactivation of at least one encryption procedure that it usually sets up with the user equipment UE1 during its encrypted communications via the core network CN, then it accepts the request from the user equipment UE1 and responds to it with an "Optimized-Configuration-Accept" acceptance message, as mentioned above for variant 1. It should be noted that the FF entity can proceed with additional security checks before positively responding to the user equipment UE1 (for example, to an authentication).

If the requested FF entity does not support the procedure requested by the user equipment UE1, it can ignore its request or send it an error message (for example, a "Fail" message), as described above for variant 1.

In the example contemplated in FIG. 8, the entity FF1 responds by means of such a message and rejects the authorization request from the user equipment UE1 (step F40), while the entities FF2 and FFm positively respond to the user equipment UE1 (steps F70 and F100).

The acceptance by an FF entity of the deactivation of the QUIC encryption procedure with the user equipment UE1 triggers the sending of at least one item of "Optimized INFO" deactivation context information in the "Optimized-Configuration-Accept" message, as mentioned above. This "Optimized INFO" information comprises, as in variant 1, at least one indication concerning at least example, one encryption procedure (for the QUIC encryption procedure) that can be deactivated by the user equipment UE1 with the FF entity in question. Such an indication is, for example, an application of the user equipment UE1, a type of connection (for example, a QUIC connection), an access network used by the user equipment UE1 eligible for the deactivation of an encryption procedure with the FF entity, or at least one specific encryption procedure used with the FF entity that can be deactivated, or, on the contrary, that cannot be deactivated by the user equipment UE1. The deactivation context information can also include a NONCE security key intended to be presented by the user equipment UE1 to the FF entity when the user equipment UE1 will establish a connection therewith, during which connection at least one encryption procedure the FF with entity is deactivated.

Furthermore, the FF entity is configured to be able to establish a connection (in the contemplated example of the QUIC protocol), or more generally a communication with the user equipment UE1 in which the one or more encryption procedures selected by the latter are deactivated, and to process the data packets exchanged between the user equipment UE1 and the server S1 passing through the FF entity. This configuration in this case particularly comprises the creation of a connection context CNT (Id (UE1), DESACT) in anticipation of this connection or this communication with the user equipment UE1, intended to be used by the modules 13A-13C of the FF entity for processing the packets passing through the FF entity. The connection context CNT (Id (UE1), DESACT) is stored in a memory of the FF entity (for example, in its non-volatile memory 11) (step F110).

Upon receipt of the authorizations of the entities FF2, . . . . FFm by its negotiation module 7D, the user equipment UE1 extracts the "Optimized INFO" deactivation context information from the "Optimized-Configuration-Accept" message and stores it, for example, in its non-volatile memory (step F100).

Then, as in variant 1, the user equipment UE1 deactivates, by means of its deactivation module 7C, the one or more encryption procedures for which it has received an authorization from the FF entities (step F120). In other words, when, for routing the data packets exchanged during its encrypted communication with the server S1, it establishes QUIC connections via its communication module 7A with the one or more FF entities FF of the core network CN associated with the one or more deactivated encryption procedures or a connection with the server S1 via this FF entity or these FF entities, these connections are set up without implementing this or these encryption procedures with the one or more FF entities in question (in the example of FIG. 8, the QUIC tunnels are established with encryption with the entity FF1 (step F130) and without encryption with the entities FF2 and FFm (steps F140, F150)).

FIG. 9 illustrates the result of the deactivations undertaken by the user equipment UE1 in the example of FIG. 8 where the entities FF2, . . . , FFm have accepted deactivations, whereas such a deactivation has been refused by the entity FF1 (for the sake of simplification, only the entities FF1, FF2 and FFm are shown in FIG. 9). The QUIC encapsulation and encryption are maintained on the one or more connections established between the user equipment UE1 and the entity FF1, whereas the QUIC encryptions are deactivated on the connections established with the other entities FF2, . . . , FFm (the user equipment UE1 nevertheless maintains the tunnels established with these entities in the example of FIG. 9).

It should be noted that, in variant 2 as described above, the user equipment UE1 determines, before starting its negotiation, the entities with which it wishes to deactivate one or more encryption procedures, then, as long as these entities accept such a deactivation, it deactivates, by means of its deactivation module 7C, the encryption procedures implemented with these entities when it establishes connections therewith. In an adaptation of variant 2, the user equipment UE1 can proceed with a first selection of the FF entities with which it wishes to deactivate one or more encryption procedures, can trigger a negotiation therewith, as described above, and then, on the basis of the "Optimized INFO" deactivation context information received from the latter, can proceed with a second, optionally more limited, selection of the FF entities with which it will effectively deactivate the encryption procedures during an encrypted communication with a remote device.

Variant 3:

Variant 3 is illustrated in FIGS. 10A and 10B, which respectively show the various steps implemented in this variant 3 by the user equipment UE1 and by each FF entity requested by the user equipment UE1. By way of a reminder according to variant 3, the user equipment UE1 by default deactivates the encryption procedures with all or some of the FF entities involved in routing the data exchanged with a remote device during an encrypted communication with this remote device.

For the sake of simplification, the elements of variant 3 that are identical or similar to the corresponding elements of variants 1 and/or 2 (for example, the deactivation context information, the criteria applied by the user equipment UE to select the encryption procedures to be deactivated, etc.) are not described in detail hereafter.

With reference to FIG. 10A, as in variant 2, it is assumed that entities FF1, FF2, . . . , FFm, with "m" denoting an integer greater than or equal to 1, are explicitly configured (declared) in the user equipment UE1, by using, for example, mechanisms that are known to a person skilled in the art, such as DHCP (Dynamic Host Configuration Protocol) or PCO (Protocol Configuration Option) and that, on the basis of this configuration, the user equipment UE1 determines via its selection module 7B that redundant encryptions will be set up for processing the same data packets, when it will establish an encrypted communication with a remote device such as, for example, the server S1, and identifies the FF entities with which these redundant encryptions will be set up (step G10). It should be noted that the selection module 7B can undertake a selection from among the FF entities thus identified, according to criteria similar to those previously described with reference to variants 1 and 2, or can attempt to deactivate the encryption procedures with each of the identified FF entities.

For the FF entities selected by its selection module 7B, the user equipment UE1 by default deactivates, via its deactivation module 7C, the encryption procedures (for example, the QUIC encryption procedures in this case) that are normally implemented with these FF entities when establishing a connection supporting an encrypted communication of the user equipment UE1 with a remote device such as the server S1 (step G20). In the example contemplated herein, the QUIC tunnels established with these FF entities are maintained.

Then, for each selected FF entity, the user equipment UE1 attempts to establish a connection (first connection within the meaning of the invention) with or via this FF entity in which the encryption procedure is deactivated (step G30). In the example contemplated herein of the use of the QUIC protocol for encapsulating the data passing through the FF entity in question, the user equipment UE1 to this end sends, via its communication module 7A, a new QUIC frame, referred to herein as "TUNNEL-NULL-ENCRYPTION", to the FF entity, which frame has a "Status" parameter set to "Enable" and was newly created for the requirements of the invention. The aim of this QUIC frame is to ask the FF entity to establish a connection with the FF entity in which the encryption procedure provided by the QUIC protocol is deactivated (formalized by the "Status" parameter set to "Enable").

With reference to FIG. 10B, upon receipt of this frame by the FF entity (step H10), and more specifically by its communication module 13A, the latter determines whether the FF entity accepts the optimization procedure required by the user equipment UE1 aimed at deactivating the QUIC encryption of the data transmitted to or intended for the user equipment UE1 and passing through this FF entity (test step H20). Other encryption procedures also can be deactivated, in addition to or as a replacement for QUIC encryption.

If the requested FF entity supports and accepts the deactivation of the encryption that is proposed by default by the user equipment UE1 ("yes" response in test step H20), then it accepts the establishment of the connection with the user equipment UE1 (step H30). The deactivation module 13B of the FF entity is then configured so that the FF entity is able to process the unencrypted packets exchanged via this connection between the user equipment UE1 and the server S1 (H40). The connection without encryption is then established between the user equipment UE1 and the FF entity (step G50, FIG. 10A): it follows that the data exchanged between the user equipment UE1 and the remote server S1 passes through the FF entity into a tunnel established between the user equipment UE1 and the FF entity without implementing encryption.

If, on the contrary, the requested FF entity does not support, due, for example, to a configuration of the core network CN, the deactivation of the encryption proposed by the user equipment UE1 or refuses to establish a connection the with user equipment UE1 without applying the encryption procedure provided by the QUIC protocol ("no" response in step H20), then it refuses the request to establish a connection requested by the user equipment UE1 (step H50). In variant 3 described herein, this refusal is formulated by the communication module 13A of the FF entity sending a QUIc frame, referred to as TUNNEL-NULL-ENCRYPTION, with the Status parameter set to "Disable", optionally supplemented with a code explaining the reason for the refusal formulated by the FF entity (for example, reaching a threshold for establishing tunnels without encryption).

Upon receipt of the TUNNEL-NULL-ENCRYPTION (Status=Disable) frame, the user equipment UE1 cancels, via its deactivation module 7C, the deactivation of the QUIC encryption procedure applied by default during the first connection and attempts to establish a second connection with or via the FF entity in which this encryption procedure is applied (step G60).

If the FF entity accepts the connection request sent by the user equipment UE1, the second connection is established and the data exchanged between the user equipment UE1 and the remote server S1 passes through the FF entity in the encrypted tunnel established between the user equipment UE1 and the FF entity (steps G70 and H60).

The user equipment UE1 continues in this way for each of the FF entities of the core network CN involved in routing the data packets exchanged between the user equipment UE1 and its correspondent (for example, the server S1).

It should be noted that although the three variants have been described separately, the user equipment UE1 can be configured to implement these three variants in a combined manner, for example, as a function of the considered FF entities.

Furthermore, as mentioned above, although these three variants have been described in relation to the deactivation of encryption procedures, they also can be applied in a similar or identical manner to the deactivation of encapsulation procedures and/or to the deactivation of encryption and encapsulation procedures.

Furthermore, these three variants have been illustrated by more specifically considering the deactivation of the QUIC encryption procedure. However, as mentioned above, other encryption procedures, which are particularly involved on other layers of the OSI model, can be deactivated by means of the invention. For example, the invention is applicable to deactivating encryption procedures implemented on the physical layer of the OSI model. By way of an illustration, encryption on the physical layer of the OSI model for accessing a 3GPP network is based on the PDCP (Packet Data Convergence Protocol) protocol that is particularly described in 3GPP documents TS 25.323 v16.0.0 or TS 38.323 v16.1.0. According to this protocol, the default encryption that is applied is based on an algorithm such as EEA2, which is per se known, and on the use of a "securityModeCommand" in RRC ("Radio Resource Control") mode. In order to deactivate this encryption procedure on a connection with an FF entity, it is possible, for example, to use the "NULL" mode feature of the EEA0 or EIA0 algorithms, and to contemplate the user equipment UE1 executing the following RRC context:

securityModeCommand-r8: : =SEQUENCE [0]
securityConfigSMC: : =SEQUENCE
securityAlgorithmConfig: : =SEQUENCE
cipheringAlgorithm: : =ENUMERATED [eea0]
integrityProtAlgorithm: : =ENUMERATED [eia0]
EXTENSION: : =SEQUENCE
nonCriticalExtension: : =SEQUENCE OPTIONAL: Omit However, this example is only provided by way of an illustration and by no means limits the invention.

The three variants have also been described under the assumption that the encrypted communication between the user equipment UE1 and the remote device is based on the establishment of connections between the user equipment UE1, respectively the remote device, and each of the FF entities involved in routing the data exchanged between the user equipment UE1 and the remote device. However, as mentioned several times, this assumption is by no means limiting per se and the invention is applicable in other contexts where, for example, the exchanges between the user equipment UE1 and the FF entities are based on an association rather than a connection.

Although the present disclosure has been described with reference to one or more examples, workers skilled in the art will recognize that changes may be made in form and detail without departing from the scope of the disclosure and/or the appended claims.

The invention claimed is:

1. A configuration method for configuring a user equipment, which is implemented by the user equipment and comprises:
deactivating, for at least one encrypted communication of the user equipment with a remote device via a network, at least one encryption procedure selected by the user equipment and implemented with a first entity of the network involved in routing data exchanged between the user equipment and the remote device during the encrypted communication, with the data being subject to at least one other encryption procedure distinct from the at least one encryption procedure that is deactivated.

2. The configuration method as claimed in claim 1, wherein the deactivating further comprises deactivating a procedure for establishing a tunnel with said the first entity.

3. The configuration method as claimed in claim 1, wherein the at least one other encryption procedure comprises:
an encryption procedure implemented with another entity of the network involved in routing the data; and/or
an encryption procedure implemented on a network used by the user equipment to exchange the data with the remote device; and/or
an encryption procedure implemented with the remote device for exchanging the data.

4. The configuration method as claimed in claim 1, wherein the deactivating is conditional upon reception of a prior authorization originating from a second entity of the network and requested by the user equipment.

5. The configuration method as claimed in claim 4, further comprising, prior to the deactivating, receiving, originating from the second entity of the network, at least one item of information, called deactivation context information, providing at least one indication concerning at least one encryption procedure and/or at least one tunnel establishment procedure that can be deactivated by the user equipment.

6. The configuration method as claimed in claim 5, wherein the at least one item of deactivation context information comprises at least one indication of:
at least one entity of the network with which an encryption procedure and/or a tunnel establishment procedure can be deactivated; and/or
at least one type of connection during which one of the procedures can be deactivated; and/or
at least one network for accessing the network for which one of the procedures can be deactivated.

7. The configuration method as claimed in claim 5, wherein the at least one item of deactivation context information further comprises a security key to be presented by the user equipment to the first entity of the network with which the encryption procedure and/or the tunnel establishment procedure is deactivated.

8. The configuration method as claimed in claim 5, wherein the at least one encryption procedure and/or the tunnel establishment procedure selected by the user equipment is/are selected as a function of the at least one item of deactivation context information received from the second entity.

9. The configuration method as claimed in claim 2, comprising, following the deactivating:
requesting establishment of a first connection with or via the first entity, in which the at least one other encryption procedure and/or the procedure for establishing a tunnel is/are deactivated;

in the event of a rejection of the first connection by the first entity, requesting establishment of a second connection with or via the first entity, in which the at least one other encryption procedure and/or the procedure for establishing a tunnel is/are activated between the user equipment and the first entity.

10. A negotiation method for negotiating between a second entity of a network and a user equipment of the network, said method comprising:
receiving, by the second entity, an authorization request by the user equipment for deactivating, for at least one encrypted communication of the user equipment with a remote device via the network, at least one encryption procedure implemented with at least one first entity of the network involved in routing data exchanged between the user equipment and the remote device during the encrypted communication;
in response to the request being accepted, sending, by the second entity, at least one item of information, called deactivation context information, intended for the user equipment, with the at least one item of information providing at least one indication concerning at least one of the at least one encryption procedure that can be deactivated by the user equipment.

11. The negotiation method as claimed in claim 10, further comprising configuring, by the second entity, the first entity in order to process data exchanged between the user equipment and the remote device during the encrypted communication when an encryption procedure with the first entity is deactivated by the user equipment.

12. A management method for managing a connection of a user equipment of a network by a first entity of the network involved in routing data exchanged between the user equipment and a remote device during an encrypted communication, said management method comprising:
receiving, from the user equipment, a request to establish a first connection with or via the first entity, in which at least one encryption procedure between the first entity and the user equipment, selected by the user equipment, is deactivated;
if the first entity accepts the establishment of the first connection, processing data exchanged, during the encrypted communication, between the user equipment and the remote device via the first connection;
otherwise, processing data exchanged, during the encrypted communication, between the user equipment and the remote device via a second connection established by the user equipment with or via the first entity, in which the encryption procedure is activated between the user equipment and the first entity.

13. The method as claimed in claim 4, wherein the second entity is the first entity, or a network control entity capable of configuring the first entity to deactivate the encryption procedure or another network control entity capable of relaying an authorization request from the user equipment to this control entity.

14. The method as claimed in claim 1, comprising using Quick User Datagram Protocol (UDP) Internet Connections (QUIC) protocol during the encrypted communication.

15. A user equipment of a telecommunications network comprising:
a processor; and
a non-transitory computer readable medium comprising instructions stored thereon which when executed by the processor configure the user equipment to:
deactivate, for at least one encrypted communication of the user equipment with a remote device via the network, at least one encryption procedure selected by the user equipment and implemented with a first entity of the network involved in routing data exchanged between the user equipment and the remote device during the encrypted communication, with the data being subject to at least one other encryption procedure distinct from the at least one encryption procedure that is deactivated.

16. The user equipment as claimed in claim 15, wherein the instructions further configure the user equipment to deactivate the at least one encryption procedure following a prior authorization, received from a second entity of the network, requested by the user equipment.

17. The user equipment as claimed in claim 15, wherein the instructions further configure the user equipment to:
request establishment of a first connection with or via the first entity in which the encryption procedure is deactivated;
in the event of a rejection of the first connection by the first entity, requesting establishment of a second connection with or via the first entity in which the encryption procedure is activated between the user equipment and the first entity.

18. A second entity of a network comprising:
a processor; and
a non-transitory computer readable medium comprising instructions stored thereon which when executed by the processor configure the second entity to:
process a request by a user equipment of the network to authorize deactivation, for at least one encrypted communication of the user equipment with a remote device via the network, of at least one encryption procedure implemented with at least one first entity of the network involved in routing data exchanged between the user equipment and the remote device during the encrypted communication;
send, if the request is accepted, at least one item of deactivation context information, intended for the user equipment, with the at least one item of deactivation context information providing at least one indication concerning at least one of the at least one encryption procedure that can be deactivated by the user equipment.

19. A first entity of a network able to be involved in routing data exchanged between a user equipment of the network and a remote device during an encrypted communication, the first entity comprising:
a processor; and
a non-transitory computer readable medium comprising instructions stored thereon which when executed by the processor configure the first entity to:
deactivate, during the encrypted communication, an encryption procedure with the user equipment, selected by the user equipment; and
process the data exchanged during the encrypted communication between the user equipment and the remote device, passing through the first entity.

20. The first entity of the network as claimed in claim 19, wherein the instructions further configure the first entity to:
process an establishment request, received from the user equipment, to establish a first connection with or via the first entity in which at least one encryption procedure between the first entity and the user equipment, selected by the user equipment, is deactivated during the encrypted communication;

if the establishment request is accepted, process the data exchanged, during the encrypted communication, between the user equipment and the remote device via the first connection; and if the establishment request is rejected, process data exchanged, during the encrypted communication, between the user equipment and the remote device via a second connection established by the user equipment in which the encryption procedure is implemented between the user equipment and the first entity.

* * * * *